(12) United States Patent
Kadowaki et al.

(10) Patent No.: US 12,030,702 B2
(45) Date of Patent: Jul. 9, 2024

(54) CAN LID MADE OF RESIN LAMINATE STEEL SHEET FOR RESIN-METAL COMPOSITE CONTAINER, CAN BOTTOM MADE OF RESIN LAMINATE STEEL SHEET FOR RESIN-METAL COMPOSITE CONTAINER, AND RESIN-METAL COMPOSITE CONTAINER

(71) Applicant: NIPPON STEEL CORPORATION, Tokyo (JP)

(72) Inventors: Nobuo Kadowaki, Tokyo (JP); Kazushi Iwakiri, Tokyo (JP); Tomohiro Mizutani, Tokyo (JP); Satoshi Kato, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 679 days.

(21) Appl. No.: 17/290,453

(22) PCT Filed: Feb. 6, 2020

(86) PCT No.: PCT/JP2020/004475
§ 371 (c)(1),
(2) Date: Apr. 30, 2021

(87) PCT Pub. No.: WO2020/162524
PCT Pub. Date: Aug. 13, 2020

(65) Prior Publication Data
US 2022/0033136 A1    Feb. 3, 2022

(30) Foreign Application Priority Data
Feb. 7, 2019    (JP) ................. 2019-020682

(51) Int. Cl.
*B32B 15/09*    (2006.01)
*B32B 15/18*    (2006.01)
(Continued)

(52) U.S. Cl.
CPC ............. *B65D 7/38* (2013.01); *B32B 15/09* (2013.01); *B32B 15/18* (2013.01); *B32B 27/08* (2013.01);
(Continued)

(58) Field of Classification Search
CPC ....... B32B 15/085; B32B 15/09; B32B 15/18; B32B 2439/66
(Continued)

(56) References Cited

U.S. PATENT DOCUMENTS 3,547,305 A * 12/1970 Khoury ................ B65D 17/502
968/819
3,580,464 A * 5/1971 Griffith .................. B65D 15/06
229/5.5
(Continued)

FOREIGN PATENT DOCUMENTS

EP    0408268 A2 *  7/1991 ............. B65D 17/50
EP    0 875 370 A2   11/1998
(Continued)

OTHER PUBLICATIONS

"Geometrical Product Specifications (GPS)-Surface texture: Profile method-Terms, definitions and surface texture parameters", JIS B 0601, 2013, total 27 pages.

*Primary Examiner* — Michael C Romanowski
(74) *Attorney, Agent, or Firm* — Birch, Stewart, Kolasch & Birch, LLP

(57) ABSTRACT

A can lid made of a resin laminate steel sheet for a resin-metal composite container, includes: a top sheet portion; and a curved portion located at an outer periphery of the top sheet portion, in which the resin laminate steel sheet includes a steel sheet, a thermoplastic polyester-based resin layer provided at a first surface of the steel sheet, a modified polypropylene-based resin layer provided at a second sur-
(Continued)

face of the steel sheet, a polypropylene-based resin layer, and an ethylene-propylene copolymer resin layer, a melting point of the ethylene-propylene copolymer resin layer is 135° C. or higher and 150° C. or lower, a melting point of the thermoplastic polyester-based resin layer is higher than a melting point of the polypropylene-based resin layer by 40° C. or more, and a range of a proportion of the ethylene component in the ethylene-propylene copolymer in the ethylene-propylene copolymer resin layer is 1.0 mass % or more and 45.0 mass % or less.

6 Claims, 11 Drawing Sheets

(51) Int. Cl.
| | |
|---|---|
| *B32B 27/08* | (2006.01) |
| *B32B 27/32* | (2006.01) |
| *B32B 27/36* | (2006.01) |
| *B65D 6/00* | (2006.01) |
| *B65D 6/32* | (2006.01) |
| *B65D 8/00* | (2006.01) |
| *B65D 17/00* | (2006.01) |
| *C08L 23/14* | (2006.01) |

(52) U.S. Cl.
CPC .............. *B32B 27/32* (2013.01); *B32B 27/36* (2013.01); *B65D 7/04* (2013.01); *B32B 2270/00* (2013.01); *B32B 2307/732* (2013.01); *B32B 2439/66* (2013.01); *C08L 23/14* (2013.01)

(58) Field of Classification Search
USPC ................. 428/35.8, 35.9; 220/200–359.4
See application file for complete search history.

(56) References Cited

U.S. PATENT DOCUMENTS

| | | | | |
|---|---|---|---|---|
| 3,832,963 A * | 9/1974 | Gayner | ............... | B32B 15/08 413/18 |
| 3,861,976 A * | 1/1975 | Gayner | ............... | B21D 51/44 156/330 |
| 4,403,710 A * | 9/1983 | Hirota | ............... | B21D 51/383 220/270 |
| 4,451,506 A * | 5/1984 | Kobayashi | ............... | C09D 5/08 428/458 |
| 4,501,375 A * | 2/1985 | Katsura | ............... | B65D 17/4012 220/270 |
| 4,588,621 A * | 5/1986 | Bunel | ............... | B32B 15/08 428/35.9 |
| 4,589,568 A * | 5/1986 | Ito | ............... | B32B 27/32 220/359.3 |
| 4,658,434 A * | 4/1987 | Murray | ............... | B65D 31/02 428/35.9 |
| 4,692,132 A * | 9/1987 | Ikushima | ............... | B65D 3/22 493/110 |
| 4,741,934 A * | 5/1988 | Terayama | ............... | B05D 7/22 413/1 |
| 4,945,008 A * | 7/1990 | Heyes | ............... | B32B 27/08 428/476.3 |
| 4,957,820 A * | 9/1990 | Heyes | ............... | B32B 37/085 428/458 |
| 4,980,210 A * | 12/1990 | Heyes | ............... | B32B 27/34 428/35.9 |
| 5,069,355 A * | 12/1991 | Matuszak | ............... | B65D 17/502 220/276 |
| 5,079,052 A * | 1/1992 | Heyes | ............... | B32B 15/088 428/476.3 |
| 5,093,208 A * | 3/1992 | Heyes | ............... | B32B 7/02 428/458 |
| 5,100,708 A * | 3/1992 | Heyes | ............... | B32B 1/00 428/458 |
| 5,348,809 A * | 9/1994 | Oyagi | ............... | B65D 17/404 428/458 |
| 5,582,319 A * | 12/1996 | Heyes | ............... | B32B 27/322 428/35.8 |
| 5,597,436 A * | 1/1997 | Ooyagi | ............... | B32B 15/08 156/324 |
| 5,752,614 A * | 5/1998 | Nelson | ............... | B65D 17/502 220/254.1 |
| 5,927,536 A * | 7/1999 | Oyagi | ............... | B21D 51/383 413/15 |
| 5,976,651 A * | 11/1999 | Tatsumi | ............... | C08L 23/10 156/244.11 |
| 6,302,321 B1 * | 10/2001 | Reese | ............... | B65D 77/2044 229/5.5 |
| 6,723,441 B1 * | 4/2004 | Yamanaka | ............... | B32B 15/20 428/688 |
| 8,287,220 B2 * | 10/2012 | Oberholzer | ............... | B21D 51/443 220/254.1 |
| 8,413,834 B2 * | 4/2013 | Oberholzer | ............... | B65D 7/36 413/4 |
| 8,551,281 B2 * | 10/2013 | Kazeoka | ............... | B32B 15/085 156/324 |
| 10,227,156 B2 * | 3/2019 | Nakagawa | ............... | B32B 15/00 |
| 2004/0022604 A1 * | 2/2004 | Sinsel | ............... | C25D 11/38 413/1 |
| 2004/0211780 A1 * | 10/2004 | Turner | ............... | B65D 17/4012 413/4 |
| 2005/0150891 A1 * | 7/2005 | Schalk | ............... | B65D 17/401 220/276 |
| 2005/0242097 A1 * | 11/2005 | Morin | ............... | B65D 17/502 220/359.4 |
| 2009/0061133 A1 * | 3/2009 | Kojima | ............... | B32B 27/36 428/35.8 |
| 2009/0250464 A1 * | 10/2009 | Jongsma | ............... | B29C 66/81425 156/60 |
| 2009/0261099 A1 * | 10/2009 | Jongsma | ............... | B29C 51/14 220/213 |
| 2011/0127268 A1 * | 6/2011 | Boehler | ............... | B65D 21/0213 220/359.4 |
| 2012/0043324 A1 * | 2/2012 | Baker | ............... | B65D 17/502 220/276 |
| 2012/0193360 A1 * | 8/2012 | Deltour | ............... | B65D 17/502 220/260 |
| 2013/0248533 A1 * | 9/2013 | Wallis | ............... | B65D 43/0202 220/359.1 |
| 2019/0091969 A1 * | 3/2019 | Penning | ............... | B32B 7/12 |
| 2020/0189791 A1 * | 6/2020 | Dregger | ............... | B29C 53/50 |
| 2020/0338863 A1 * | 10/2020 | Kawai | ............... | B32B 27/08 |
| 2021/0016543 A1 * | 1/2021 | Smith | ............... | B32B 7/06 |

FOREIGN PATENT DOCUMENTS

| | | | | |
|---|---|---|---|---|
| EP | 2517973 A1 * | 10/2012 | ............ | B65D 17/50 |
| JP | 10-305871 A | 11/1998 | | |
| WO | WO-0200512 A1 * | 1/2002 | ............ | B65D 17/502 |
| WO | WO-03006329 A2 * | 1/2003 | ............ | B65D 17/502 |
| WO | WO-2007020955 A1 * | 2/2007 | ............ | B32B 15/08 |

\* cited by examiner (1) THICKNESS (μm) OF PE-PP LAYER (2) THICKNESS (μm) OF PP LAYER

CAN LID MADE OF RESIN LAMINATE STEEL SHEET FOR RESIN-METAL COMPOSITE CONTAINER, CAN BOTTOM MADE OF RESIN LAMINATE STEEL SHEET FOR RESIN-METAL COMPOSITE CONTAINER, AND RESIN-METAL COMPOSITE CONTAINER

TECHNICAL FIELD OF THE INVENTION

The present invention relates to a can lid made of a resin laminate steel sheet for a resin-metal composite container, a can bottom made of a resin laminate steel sheet for a resin-metal composite container, and a resin-metal composite container, and particularly to a can lid made of a resin laminate steel sheet for a resin-metal composite container and a can bottom made of a resin laminate steel sheet for a resin-metal composite container to be seamed and fused to a container body having a can body made of a polypropylene-based thermoplastic resin, and a resin-metal composite container having a can body made of a polypropylene-based thermoplastic resin. Priority is claimed on Japanese Patent Application No. 2019-020682, filed Feb. 7, 2019, the content of which is incorporated herein by reference.

RELATED ART

Currently, the mainstream container for long-term storage of food is a food can consisting of a can body, a can lid, and a can bottom made of metal. However, since the contents of a metal can cannot be seen unless the can is opened, in recent years, retort pouch containers made of a transparent resin have become widespread for applications that do not require as long-term storage as cans do.

A retort pouch container made of a resin is a container obtained by filling a container having a bag shape formed by heat-sealing a resin film with food and heat-sealing the opening end, and has an advantage that the contents in the container can be visually confirmed by using a transparent film. However, since the container itself is a resin film, there is a disadvantage that the piercing strength is low.

In addition, ordinary resin films are not suitable as containers for long-term storage because the permeation of air and water vapor is unavoidable. As a transparent retort pouch container that enables relatively long-term storage, there is a container that uses a thick film in which a special film with low oxygen and water vapor permeability is laminated. However, since the film is expensive and has high tear strength due to the thick film thickness, there is a disadvantage that it is not easy to open the container with the hand.

On the other hand, Patent Document 1 proposes a laminate metal composite container with a plastic easy open lid including a lid portion having a multi-layer structure and a can body having a multi-layer structure, in which the lid portion has a polypropylene layer, a modified polypropylene layer, an aluminum layer, an adhesive layer, and a polypropylene layer from the inside to the outside of the container, the can body has a polypropylene layer, a modified polypropylene layer, and an iron or aluminum layer from the inside to the outside of the container, and flange portions of the lid portion and the can body can be thermally fusion-bonded together.

In the laminate metal composite container with a plastic easy open lid described in Patent Document 1, since it is necessary to form a pull tab for plastic easy-open on the outer surface of the lid, it is necessary to form a polypropylene layer on the outer layer of the resin laminate sheet of the lid, so that there is a disadvantage that when the lid portion and the can body are heat-sealed, marks of a heating tool for heat-sealing may remain on the outer surface film. Furthermore, since the joint portion between the flange portion of the can body and the lid portion is made of the polypropylene resin, there are cases where fusion unevenness occurs if the temperature during joining is low or the heating time is short, and there is a problem that sealability is not stable.

Regarding the problems of a metal can that the contents cannot be confirmed from the external appearance and regarding the problems of a retort pouch container that the strength of the container itself is low and the container is not suitable for long-term storage, in recent years, a resin-metal composite type container in which a thick transparent to translucent thermoplastic resin is used for a can body and a can lid is made of a resin-coated steel sheet as shown in FIG. 19 is proposed.

PRIOR ART DOCUMENT

Patent Document

[Patent Document 1] Japanese Unexamined Patent Application, First Publication No. H10-305871

DISCLOSURE OF THE INVENTION

Problems to be Solved by the Invention

However, in the resin-metal composite type container in which the thick transparent to translucent thermoplastic resin is used for the can body and the can lid and the can bottom are made of a resin-coated steel sheet, there are cases where sealability is insufficient for the applications that withstand high internal pressure such as a retort sterilization treatment, and the contents leak. In addition, there is a problem that the adhesion strength between the can body and the can lid or the joint strength between the can body and the can bottom tends to vary.

The resin-metal composite type container described above includes a can body made of a thermoplastic polypropylene (hereinafter, sometimes referred to as PP) resin forming a can body, an easy open can lid, and a can bottom. In a case where the can lid is seamed onto such a can in the same manner as the normal seaming of the can lid, the seamed portion of the can body made of the resin loosens due to the creep phenomenon of the resin as a long time elapses. Therefore, it is considered that the above problems occur. Therefore, it is preferable to suppress the risk of leakage of the contents by fusing and joining the can body made of the resin, the can lid, and the can bottom of the resin-metal composite type container to the resin on the body side. Therefore, in order to fuse the surface of the steel sheet on the can lid side and the resin on the can body side, it is preferable that the surfaces of the steel sheets of the can lid and the can bottom are coated with a resin layer that can be fused to the resin on the can body side.

However, in order to fuse the can body, the can lid, and the can bottom of the resin-metal composite type container within a short period of time in a content packing step, the resin on the can body side and the resin layer coating the surface on the can lid and the can bottom side need to be a thermoplastic resin. It is preferable that the melting point of the thermoplastic resin in the resin layer to be coated is low. A polyethylene (hereinafter, referred to as PE)-based resin may meet this condition, but is not suitable for practical use because its melting point is near the retort sterilization treatment temperature (120° C. to 130° C.). On the other hand, the polypropylene (PP)-based resin has excellent retort resistance and can be thermally fusion-bonded at a relatively low temperature of about 200° C. Therefore, the polypropylene-based resin is preferable as the kind of resin.

However, since the polypropylene-based resin does not have a functional group, the adhesion thereof to the steel sheet of the can lid is very poor as it is, and there are cases where the polypropylene-based resin is peeled at the interface between the steel sheet and the coating resin layer.

In addition, in a case where the resin coating the can lid is the same on the inner and outer surfaces, there are cases where the resin on the outer surface side of the can lid also melts when the can body and the can lid are fused, and the film is damaged.

In a case where the metal sheet of the can lid and the can bottom is aluminum, it is difficult to generate heat even if electromagnetic induction heating (IH) is performed, so the heating tool is pressed directly against the can lid and the can bottom fuse the can body, the can lid, and the can bottom in many cases. However, in these cases, the coating of the can lid and the can bottom is easily damaged.

The present invention is an invention that has been made in view of the above-described circumstances, and an object thereof is to provide a can lid made of a resin laminate steel sheet for a resin-metal composite container, and a can bottom made of a resin laminate steel sheet for a resin-metal composite container capable of obtaining high seaming strength with a can body when seamed and fused to the can body made of a transparent to translucent thermoplastic resin, and having excellent manufacturability and surface quality. Another object of the present invention to provide a resin-metal composite container having excellent surface quality and high seaming strength, using a can lid made of a resin laminate steel sheet for a resin-metal composite container, and a can bottom made of a resin laminate steel sheet for a resin-metal composite container.

Means for Solving the Problem

In order to solve the above-mentioned problems and objects, the present inventors intensively examined a layer structure of a resin laminate steel sheet capable of obtaining high seaming strength in a case where a can body is made of a polypropylene-based resin and having excellent manufacturability and surface quality.

As a result of intensive examinations by the present inventors, it was found that by using a laminate steel sheet including a thermoplastic polyester-based resin layer provided at a first surface of a steel sheet on the outside of a resin-metal composite container to be in contact with the steel sheet, a modified polypropylene-based resin layer provided at a second surface of the steel sheet on the inside of the resin-metal composite container to be in contact with the steel sheet, a polypropylene-based resin layer provided as an upper layer of the modified polypropylene-based resin layer to be in contact with the modified polypropylene-based resin layer, and an ethylene-propylene copolymer resin layer provided as an upper layer of the polypropylene-based resin layer to be in contact with the polypropylene-based resin layer and having a specific ethylene component proportion, and controlling the thickness and melting point of each layer, high sealability for a can body (can body made of a polypropylene-based resin) made of a polypropylene-based resin is provided.

That is, as illustrated in FIG. 10, in the configuration of a can lid and a can bottom made of a resin laminate steel sheet for a resin-metal composite container according to an embodiment of the present invention includes, the can lid and the can bottom include, in order from the content side of the can, (1) a PE-PP layer (ethylene-propylene copolymer resin layer) 4, (2) a PP layer (polypropylene-based resin layer) 3, (3) a modified PP layer (modified polypropylene-based resin layer) 2, (4) a steel sheet 1 (a Sn-plated steel sheet, a cold-rolled steel sheet, a TFS steel sheet, other surface-treated steel sheets, or a ferritic stainless steel sheet), and (5) a PET layer (thermoplastic polyester-based resin layer) 6. Hereinafter, to simplify the description, there are cases where the layers are simply called (1) the PE-PP layer, (2) the PP layer, (3) the modified PP layer, (4) the steel sheet, and (5) the PET layer, and the entirety of (1) the PE-PP layer, (2) the PP layer, and (3) the modified PP layer of the resin layer to be thermally fusion-bonded to the can body side is called a PP-based resin layer (PP-based laminated resin layer) 5.

The present invention has been made based on the above findings, and the gist thereof is as follows.

That is, (1) a can lid made of a resin laminate steel sheet for a resin-metal composite container according to an aspect of the present invention, includes: a top sheet portion made of a resin laminate steel sheet; and a curved portion made of the resin laminate steel sheet and located at an outer periphery of the top sheet portion, in which the resin laminate steel sheet includes a steel sheet, a thermoplastic polyester-based resin layer provided at a first surface of the steel sheet to be in contact with the steel sheet, a modified polypropylene-based resin layer provided at a second surface of the steel sheet to be in contact with the steel sheet, a polypropylene-based resin layer provided as an upper layer of the modified polypropylene-based resin layer to be in contact with the modified polypropylene-based resin layer, and an ethylene-propylene copolymer resin layer provided as an upper layer of the polypropylene-based resin layer to be in contact with the polypropylene-based resin layer and containing an ethylene-propylene copolymer including an ethylene component and a propylene component, a melting point of the ethylene-propylene copolymer resin layer is 135° C. or higher and 150° C. or lower, a melting point of the thermoplastic polyester-based resin layer is higher than a melting point of the polypropylene-based resin layer by 40° C. or more, a proportion of the ethylene component in the ethylene-propylene copolymer in the ethylene-propylene copolymer resin layer is 1.0 mass % or more and 45.0 mass % or less, an average thickness of the ethylene-propylene copolymer resin layer is 1.0 μm or more and 15.0 μm or less, an average thickness of the polypropylene-based resin layer is 6.0 μm or more, an average thickness of the modified polypropylene-based resin layer is 1.0 μm or more and 18.0 μm or less, a total average thickness of the ethylene-propylene copolymer resin layer, the polypropylene-based resin layer, and the modified polypropylene-based resin layer is 20.0 μm or more, the second surface is at an inside bend of the curved portion, and the first surface is at an outside bend of the curved portion.

(2) In the can lid made of a resin laminate steel sheet for a resin-metal composite container according to (1), the proportion of the ethylene component in the ethylene-propylene copolymer in the ethylene-propylene copolymer resin layer may be 1.0 mass % or more and 35.0 mass % or less.
(3) A can bottom made of a resin laminate steel sheet for a resin-metal composite container according to another aspect of the present invention, includes: a top sheet portion made of a resin laminate steel sheet; and a curved portion made of the resin laminate steel sheet and located at an outer periphery of the top sheet portion, in which the resin laminate steel sheet includes a steel sheet, a thermoplastic polyester-based resin layer provided at a first surface of the steel sheet to be in contact with the steel sheet, a modified polypropylene-based resin layer provided at a second surface of the steel sheet to be in contact with the steel sheet, a polypropylene-based resin layer provided as an upper layer of the modified polypropylene-based resin layer to be in contact with the modified polypropylene-based resin layer, and an ethylene-propylene copolymer resin layer provided as an upper layer of the polypropylene-based resin layer to be in contact with the polypropylene-based resin layer and containing an ethylene-propylene copolymer including an ethylene component and a propylene component, a melting point of the ethylene-propylene copolymer resin layer is 135° C. or higher and 150° C. or lower, a melting point of the thermoplastic polyester-based resin layer is higher than a melting point of the polypropylene-based resin layer by 40° C. or more, a proportion of the ethylene component in the ethylene-propylene copolymer in the ethylene-propylene copolymer resin layer is 1.0 mass % or more and 45.0 mass % or less, an average thickness of the ethylene-propylene copolymer resin layer is 1.0 μm or more and 15.0 μm or less, an average thickness of the polypropylene-based resin layer is 6.0 μm or more, an average thickness of the modified polypropylene-based resin layer is 1.0 μm or more and 18.0 μm or less, a total average thickness of the ethylene-propylene copolymer resin layer, the polypropylene-based resin layer, and the modified polypropylene-based resin layer is 20.0 μm or more, the second surface is at an inside bend of the curved portion, and the first surface is at an outside bend of the curved portion.
(4) In the can bottom made of a resin laminate steel sheet for a resin-metal composite container according to (3), the proportion of the ethylene component in the ethylene-propylene copolymer in the ethylene-propylene copolymer resin layer may be 1.0 mass % or more and 35.0 mass % or less.
(5) A resin-metal composite container according to another aspect of the present invention, includes: a can lid; a can body made of a polypropylene-based resin; a can bottom; a first seamed portion in which the can lid and the can body are seamed; and a second seamed portion in which the can bottom and the can body are seamed, in which the first seamed portion has a first fused portion in which the can lid and the can body are fused, the second seamed portion has a second fused portion in which the can bottom and the can body are fused, at least one of the can lid or the can bottom includes a steel sheet, a thermoplastic polyester-based resin layer provided at a first surface of the steel sheet to be in contact with the steel sheet, a modified polypropylene-based resin layer provided at a second surface of the steel sheet to be in contact with the steel sheet, a polypropylene-based resin layer provided as an upper layer of the modified polypropylene-based resin layer to be in contact with the modified polypropylene-based resin layer, and an ethylene-propylene copolymer resin layer provided as an upper layer of the polypropylene-based resin layer to be in contact with the polypropylene-based resin layer and containing an ethylene-propylene copolymer including an ethylene component and a propylene component, a melting point of the ethylene-propylene copolymer resin layer is 135° C. or higher and 150° C. or lower, a melting point of the thermoplastic polyester-based resin layer is higher than a melting point of the polypropylene-based resin layer by 40° C. or more, a proportion of the ethylene component in the ethylene-propylene copolymer in the ethylene-propylene copolymer resin layer is 1.0 mass % or more and 45.0 mass % or less, an average thickness of the ethylene-propylene copolymer resin layer is 1 μm or more and 15 μm or less, an average thickness of the polypropylene-based resin layer is 6 μm or more, an average thickness of the modified polypropylene-based resin layer is 1 μm or more and 18 μm or less, a total average thickness of the ethylene-propylene copolymer resin layer, the polypropylene-based resin layer, and the modified polypropylene-based resin layer is 20 μm or more, the second surface is on a can body side, and the first surface is on a side opposite to the can body side.
(6) In the resin-metal composite container according to (5), the proportion of the ethylene component in the ethylene-propylene copolymer in the ethylene-propylene copolymer resin layer may be 1.0 mass % or more and 35.0 mass % or less.

Effects of the Invention

The can lid and the can bottom made of a resin laminate steel sheet for a resin-metal composite container of the present invention can obtain high seaming strength with the can body when seamed and fused to the can body made of a transparent to translucent thermoplastic resin, do not cause fusion of the film to a laminating roll when the resin laminate steel sheet is manufactured, and thus have excellent manufacturability and surface quality. In addition, the resin-metal composite container of the present invention uses the can lid and the can bottom made of a resin laminate steel sheet for a resin-metal composite container and thus has excellent surface quality and high seaming strength.

EMBODIMENTS OF THE INVENTION

For a can body made of a thermoplastic resin primarily containing a PP resin, a can lid and a can bottom are made of a resin laminate steel sheet, the can lid and the can bottom include, in order from the content side of the can, (1) a PE-PP layer (ethylene-propylene copolymer resin layer) 4, (2) a PP layer (polypropylene-based resin layer) 3, (3) a modified PP layer (modified polypropylene-based resin layer) 2, (4) a steel sheet (steel sheet) 1, and (5) a PET layer (thermoplastic polyester-based resin layer) 6, and by setting the ranges of the PE proportion (the proportion of an ethylene component), melting point, and thickness of (1) the PE-PP layer (ethylene-propylene copolymer resin layer) 4, the thickness of (2) the PP layer (polypropylene-based resin layer) 3, and the thickness of (3) the modified PP layer (modified polypropylene-based resin layer) 2, the can lid and the can bottom made of a resin-coated steel sheet and having excellent fusibility and film adhesion to the can body are obtained.

That is, a can lid and a can bottom made of a resin laminate steel sheet for a resin-metal composite container according to an embodiment of the present invention include: a top sheet portion made of a resin laminate steel sheet; and a curved portion made of the resin laminate steel sheet and located at an outer periphery of the top sheet portion, in which the resin laminate steel sheet uses a laminate steel sheet including a thermoplastic polyester-based resin layer provided at a first surface of a steel sheet which is on the outside of a resin-metal composite container to be in contact with the steel sheet, a modified polypropylene-based resin layer provided at a second surface of the steel sheet which is on the inside of the resin-metal composite container to be in contact with the steel sheet, a polypropylene-based resin layer provided as an upper layer of the modified polypropylene-based resin layer to be in contact with the modified polypropylene-based resin layer, and an ethylene-propylene copolymer resin layer provided as an upper layer of the polypropylene-based resin layer to be in contact with the polypropylene-based resin layer and having a specific ethylene component proportion, the thickness and melting point of each layer are controlled, the second surface is at an inside bend of the curved portion, and the first surface is at an outside bend of the curved portion, whereby the fusibility and film adhesion to a can body are excellent.

Figure 1:
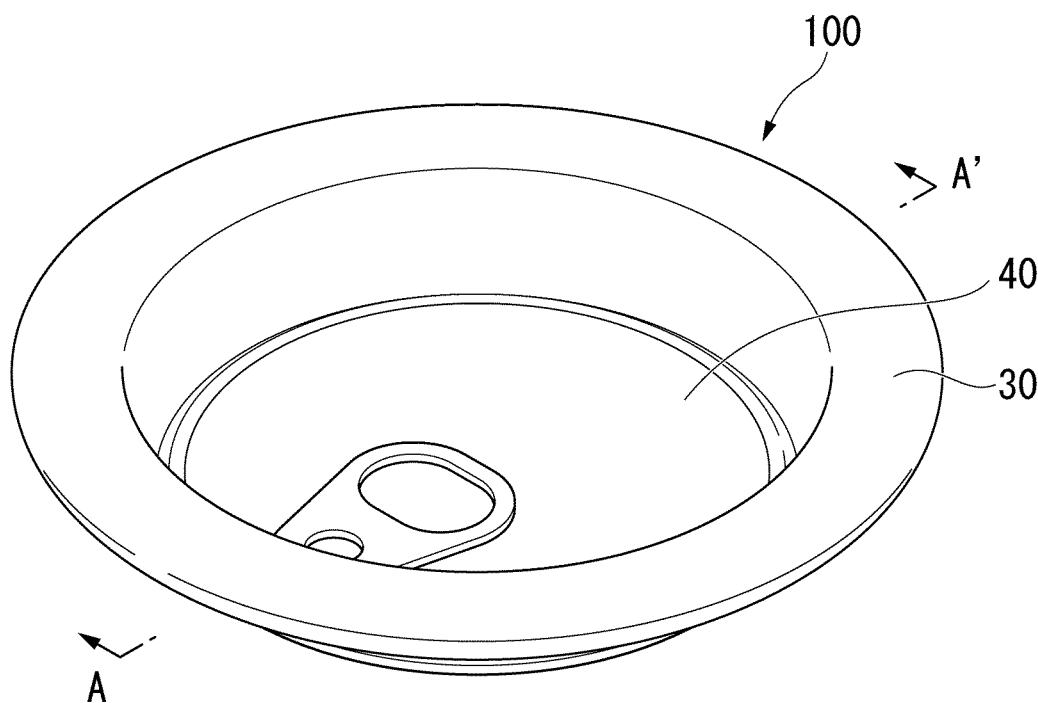
FIG. 1 is a perspective view of a can lid made of a resin laminate steel sheet for a resin-metal composite container according to an embodiment of the present invention.
Figure 2:
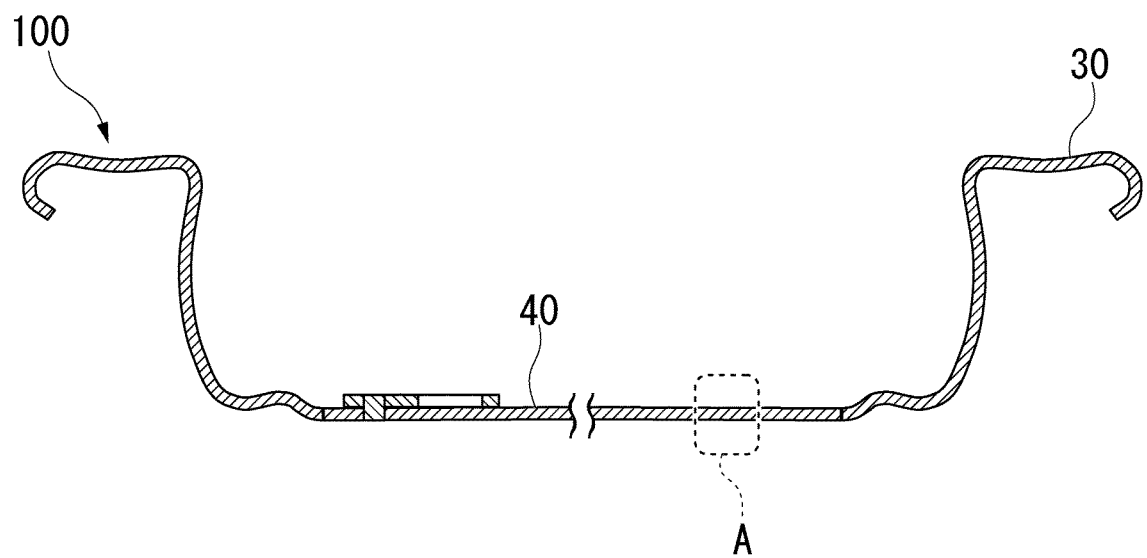
FIG. 2 is a cross-sectional view taken along the line A-A' of the can lid made of a resin laminate steel sheet for a resin-metal composite container according to the embodiment of the present invention.
Figure 3:
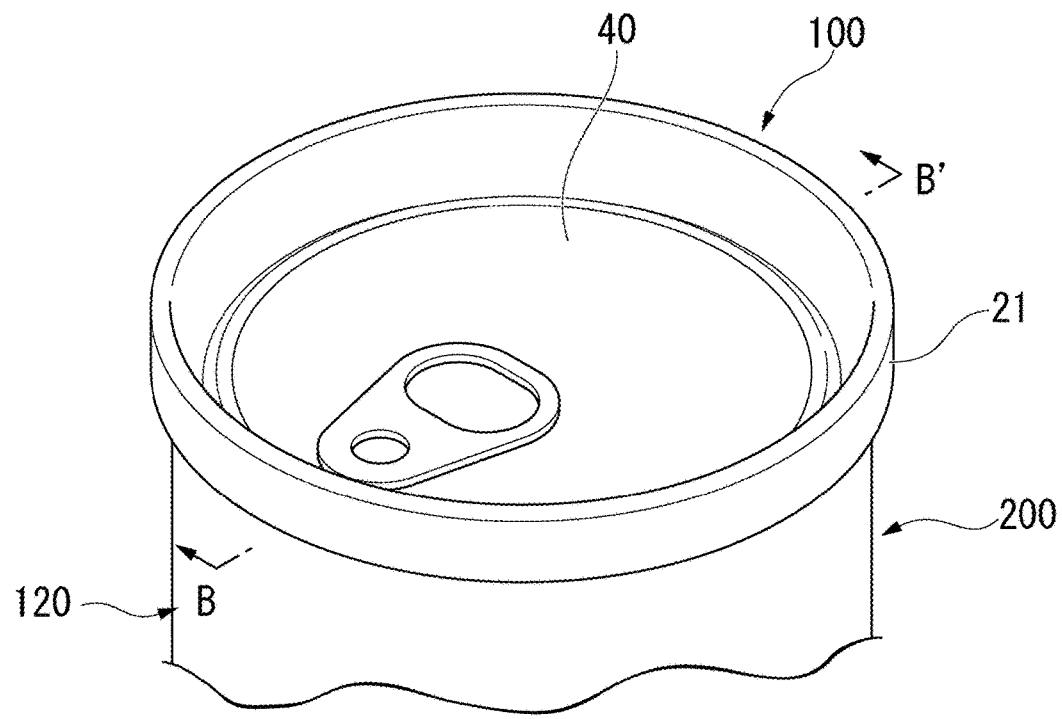
FIG. 3 is a perspective view of the can lid made of a resin laminate steel sheet for a resin-metal composite container according to the embodiment of the present invention, which is seamed onto a can body.
Figure 4:
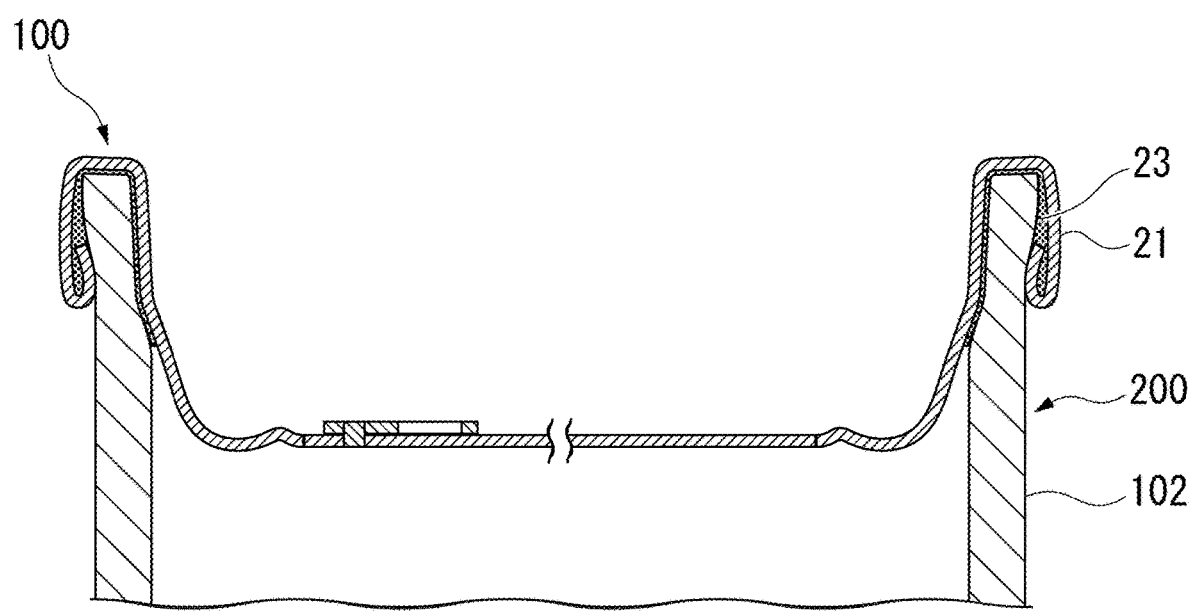
FIG. 4 is a cross-sectional view taken along the line B-B' of the can lid made of a resin laminate steel sheet for a resin-metal composite container according to the embodiment of the present invention, which is seamed onto the can body.
Figure 5:
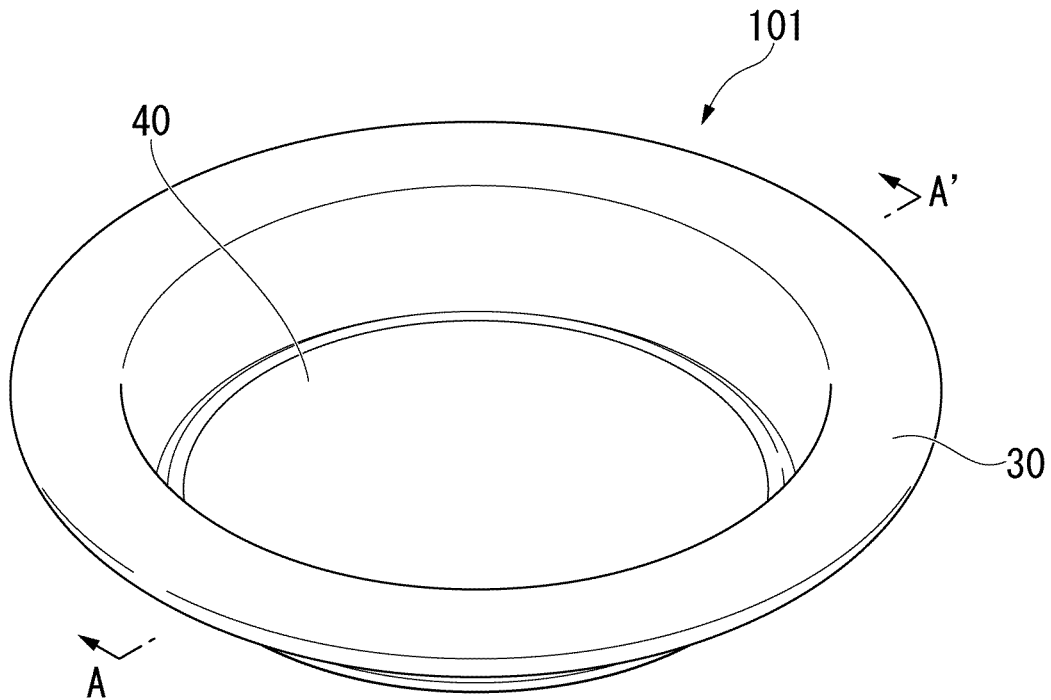
FIG. 5 is a perspective view of a can bottom made of a resin laminate steel sheet for a resin-metal composite container according to the embodiment of the present invention.
Figure 6:
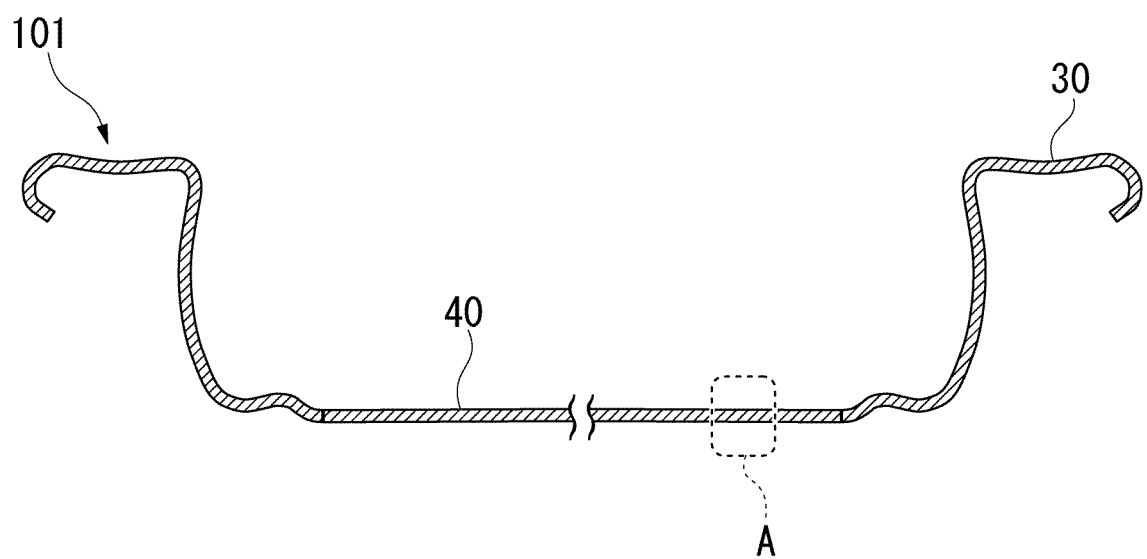
FIG. 6 is a cross-sectional view taken along the line A-A' of the can bottom made of a resin laminate steel sheet for a resin-metal composite container according to the embodiment of the present invention.
Figure 7:
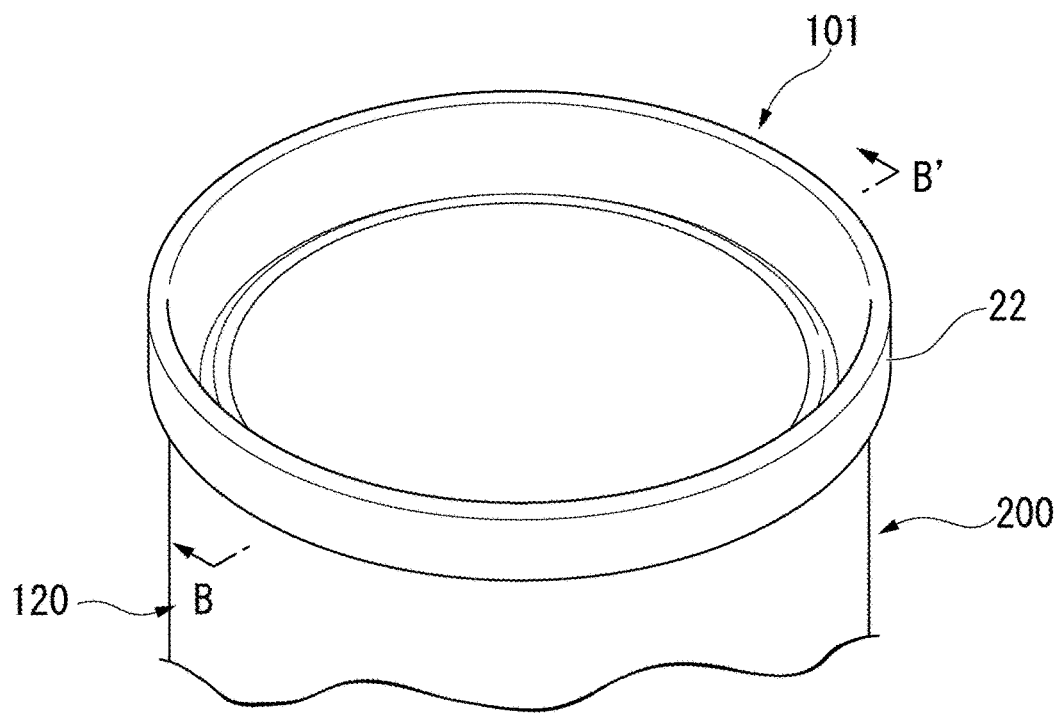
FIG. 7 is a perspective view of the can bottom made of a resin laminate steel sheet for a resin-metal composite container according to the embodiment of the present invention, which is seamed onto the can body.
Figure 8:
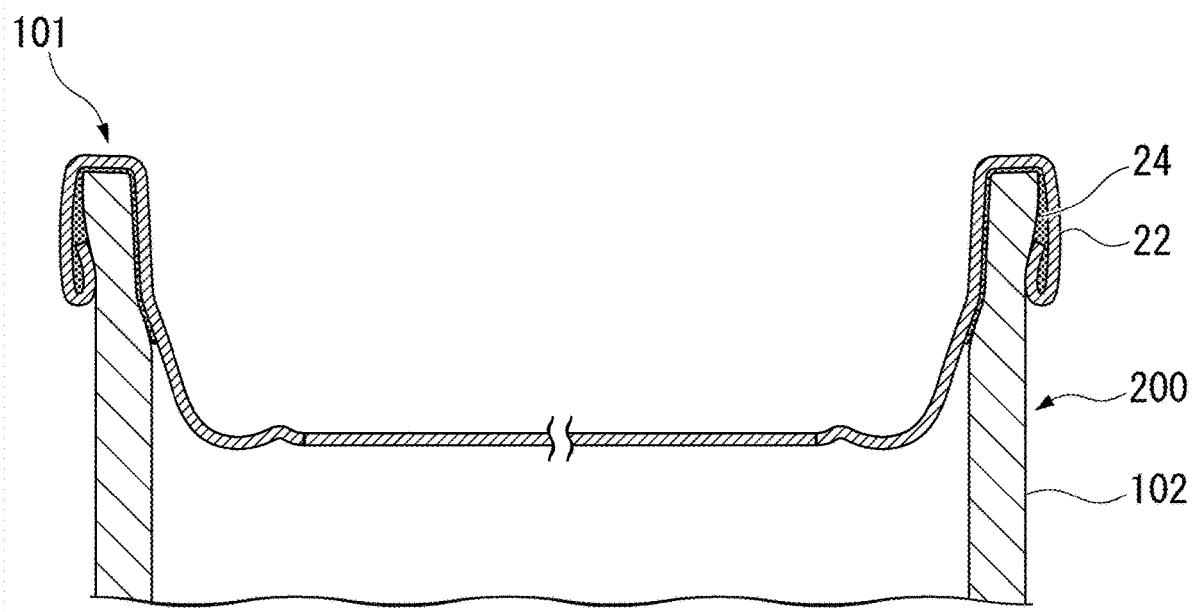
FIG. 8 is a cross-sectional view taken along the line B-B' of the can bottom made of a resin laminate steel sheet for a resin-metal composite container according to the embodiment of the present invention, which is seamed onto the can body.
Figure 9:
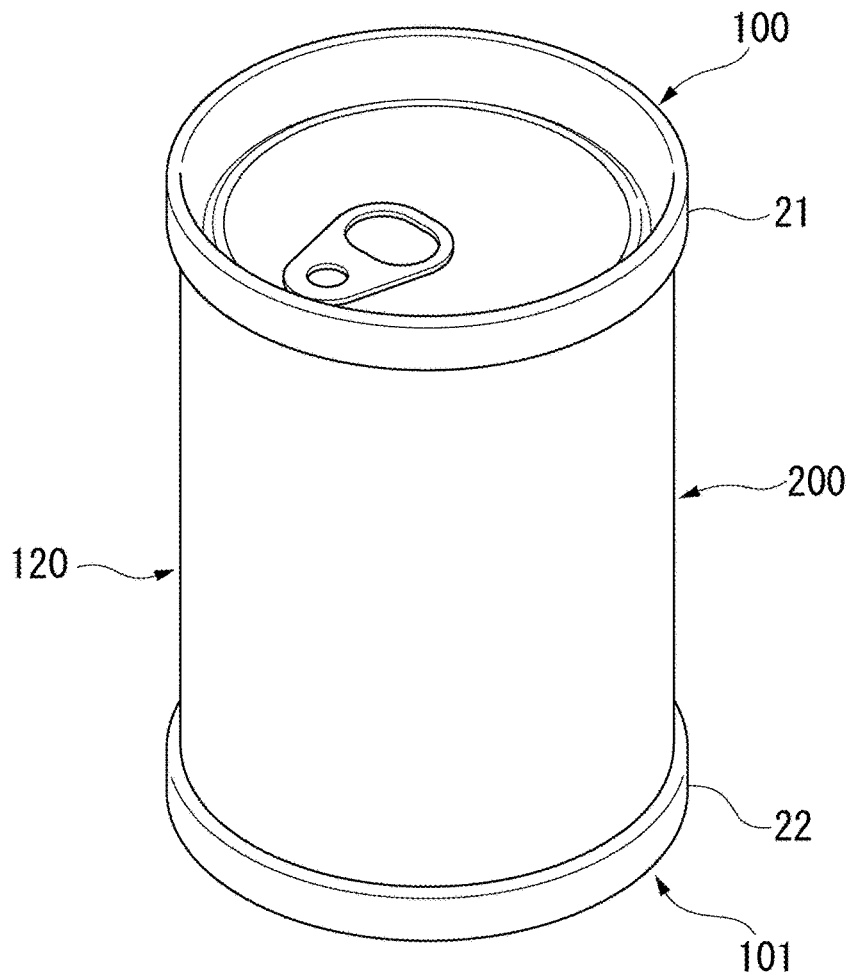
FIG. 9 is an example of the external appearance of a resin-metal composite container according to the embodiment of the present invention.
Figure 10:
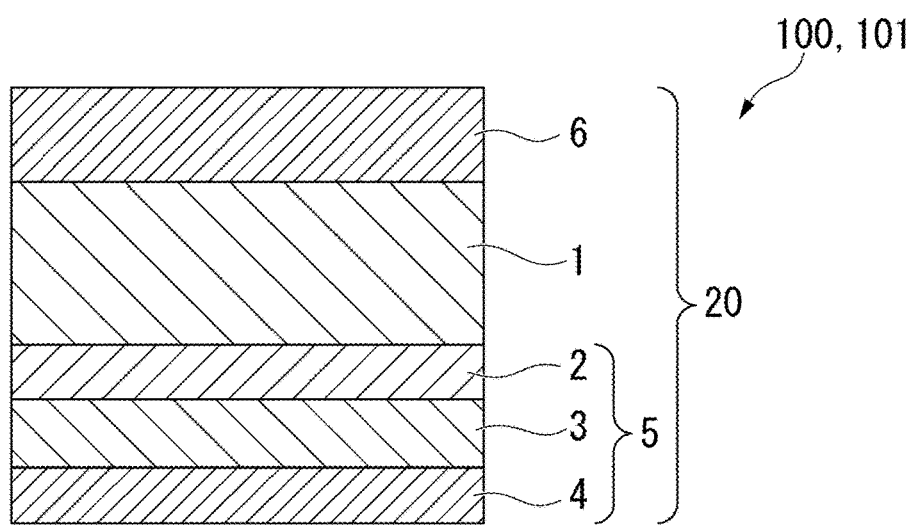
FIG. 10 is an example of an enlarged schematic view of the region A of a cross section of the can lid and the can bottom made of a resin laminate steel sheet for a resin-metal composite container according to the embodiment of the present invention.

Hereinafter, a can lid 100 and a can bottom 101 made of a resin laminate steel sheet for a resin-metal composite container and a resin-metal composite container 200 according to the present embodiment will be described in detail with reference to the drawings. FIG. 1 is a perspective view of the can lid 100 made of a resin laminate steel sheet for a resin-metal composite container according to the present embodiment. FIG. 2 is a cross-sectional view taken along the line A-A' of the can lid 100 made of a resin laminate steel sheet for a resin-metal composite container. FIG. 3 is a perspective view of the can lid 100 made of a resin laminate steel sheet for a resin-metal composite container after being seamed onto a can body 102. FIG. 4 is a cross-sectional view taken along the line B-B' of the can lid 100 made of a resin laminate steel sheet for a resin-metal composite container, which is seamed onto the can body 102. FIG. 5 is a perspective view of the can bottom 101 made of a resin laminate steel sheet for a resin-metal composite container according to the present embodiment. FIG. 6 is a cross-sectional view taken along the line A-A' of the can bottom 101 made of a resin laminate steel sheet for a resin-metal composite container. FIG. 7 is a perspective view of the can bottom 101 made of a resin laminate steel sheet for a resin-metal composite container after being seamed onto the can body 102. FIG. 8 is a cross-sectional view taken along the line B-B' of the can lid 100 made of a resin laminate steel sheet for a resin-metal composite container, which is seamed onto the can body 102. FIG. 9 is a perspective view of the resin-metal composite container 200 according to the present embodiment. FIG. 10 is an enlarged view of a portion (region A) of the cross-sectional views taken along the line A-A' of FIGS. 2 and 6 for describing the configuration of a resin laminate steel sheet 20 used in the can lid 100 made of a resin laminate steel sheet for a resin-metal composite container and the can bottom 101 made of a resin laminate steel sheet for a resin-metal composite container.

In the present specification, the numerical value range represented by using "to" means the range including the numerical values before and after "to" as the lower limit and the upper limit.

(Resin-Metal Composite Container (Can))

As illustrated in FIGS. 4, 8, and 9, the resin-metal composite container (can) 200 according to the present embodiment includes the can lid 100 and the can bottom 101 made of a resin laminate steel sheet for a resin-metal composite container according to the present embodiment, and the can body 102.

The resin-metal composite container 200 according to the present embodiment includes a first seamed portion 21 formed by seaming the can lid 100 made of a resin laminate steel sheet for a resin-metal composite container and the can body 102. The first seamed portion 21 includes a first fused portion 23 in which the can body 102 and the can lid 100 made of a resin laminate steel sheet for a resin-metal composite container are fused.

The resin-metal composite container 200 includes a second seamed portion 22 formed by seaming the can bottom 101 made of a resin laminate steel sheet for a resin-metal composite container and the can body 102. The second seamed portion 22 includes a second fused portion 24 in which the can body 102 and the can bottom 101 made of a resin laminate steel sheet for a resin-metal composite container are fused. In the resin-metal composite container 200, a PP-based resin layer 5 of the can lid 100 made of a resin laminate steel sheet for a resin-metal composite container and the can bottom 101 made of a resin laminate steel sheet for a resin-metal composite container and the polypropylene-based resin of the can body 102 are fused, whereby high seaming strength can be obtained.

(Can Body)

As the resin of the can body 102, it is preferable to use a polypropylene-based resin because it is inexpensive, is easily formed, and can be subjected to a retort sterilization treatment (high temperature pressure sterilization treatment at higher than 100° C. and about 130° C.). In particular, it is preferable to use a homopolypropylene or a block copolymer polypropylene resin in terms of strength, and it is preferable that the average thickness of the can body 102 is 0.5 mm or more from the viewpoint of strength and stiffness. In addition, it is preferable that the average thickness of the can body 102 is 3 mm or less from the viewpoint of workability.

As a method of joining the can body 102 and the can lid 100 or the can bottom 101 made of a resin laminate steel sheet for a resin-metal composite container, it is preferable that the can lid 100 or the can bottom 101 made of a resin laminate steel sheet for a resin-metal composite container is seamed, and thereafter the seamed portion is heated by pressing or heating the seamed portion with a tool heated by a heater or by IH heating to fuse the polypropylene-based resin of the can body and the resin of the resin laminate steel sheet of the can lid because the sealability between the can body and the seamed portion of the can lid and the can bottom can be increased. Since the melting point of the polypropylene-based resin in the can body is in a range of 160° C. to 165° C., it is preferable to heat the seamed portion to 180° C. or higher. Furthermore, it is preferable to heat the seamed portion to 220° C. or lower so that the thermoplastic polyester-based resin layer does not melt.

(Can Lid and Can Bottom Made of Resin Laminate Steel Sheet for Resin-Metal Composite Container)

As illustrated in FIGS. 1 and 5, the can lid 100 and the can bottom 101 made of a resin laminate steel sheet for a resin-metal composite container have a top sheet portion 40 and a curved portion 30 located at the outer periphery of the top sheet portion 40. The top sheet portion 40 and the curved portion 30 are made of a resin laminate steel sheet. An aluminum tab or the like may be provided on the top sheet portion 40 of the can lid 100 made of a resin laminate steel sheet for a resin-metal composite container. The curved portion 30 is a portion that is seamed together with the upper edge of the can body 102, which will be described later. The curved portion 30 is curved so as to be seamed onto the resin-metal composite container (can) 200, which will be described later. A first surface provided with the thermoplastic polyester-based resin layer 6 is at an outside bend of the curved portion 30 and a second surface provided with the PP-based resin layer 5 is at an inside bend of the curved portion 30 so as to be fused to the can body 102.

<Resin Laminate Steel Sheet>

Hereinafter, the resin laminate steel sheet 20 used for the can lid 100 and the can bottom 101 made of a resin laminate steel sheet for a resin-metal composite container will be described. As illustrated in FIG. 10, the resin laminate steel sheet 20 includes the thermoplastic polyester-based resin layer 6 at the first surface of the steel sheet 1 which is on the outer surface side of the resin-metal composite container (can), and includes the modified polypropylene-based resin layer 2 provided at the second surface of the steel sheet 1 which is on the inner surface side of the resin-metal composite container (can) to be in contact with the steel sheet 1, the polypropylene-based resin layer 3 provided as an upper layer of the modified polypropylene-based resin layer 2 to be in contact with the modified polypropylene-based resin layer 2, and the ethylene-propylene copolymer resin layer 4 provided as an upper layer of the polypropylene-based resin layer 3 to be in contact with the polypropylene-based resin layer 3. Hereinafter, the steel sheet 1, the modified polypropylene-based resin layer 2, the polypropylene-based resin layer 3, and the ethylene-propylene copolymer resin layer 4 will be described.

<Steel Sheet of Resin Laminate Steel Sheet Forming Can Lid and Can Bottom>

The base steel sheet (steel sheet) 1 of resin laminate steel sheet forming the can lid and the can bottom made of a resin laminate steel sheet for a resin-metal composite container according to the present embodiment is particularly preferably a steel sheet (a Sn-plated steel sheet, a cold-rolled steel sheet, a TFS steel sheet, other surface-treated steel sheets, and a ferritic stainless steel sheet) that is self-heated by an induced current considering the use of IH heating when fusing the can body and the can lid. As the steel sheet 1, a tin-plated steel sheet or a tinfree steel sheet is suitable from the viewpoints of food hygiene, workability, corrosion resistance, film adhesion, and material price.

The average thickness of the steel sheet 1 is not particularly limited. However, when the average thickness of the steel sheet 1 is less than 0.1 mm, there are cases where the workability decreases. Therefore, the average thickness of the steel sheet 1 is preferably 0.1 mm or more. When the average thickness of the steel sheet 1 exceeds 0.4 mm, it is not economical and there are cases where it is difficult to seam the can lid. Therefore, the average thickness of the steel sheet 1 is preferably 0.4 mm or less. The average thickness of the steel sheet is preferably 0.1 mm or more and 0.4 mm or less.

The surface roughness of the steel sheet 1 is not particularly limited. In a case where the surface roughness of the steel sheet 1 is less than 0.05 μm in terms of arithmetic average roughness Ra (hereinafter, also referred to as average roughness Ra) specified in JIS B 0601 (2013), if bubbles infiltrate between the steel sheet 1 and the resin film when the resin film is laminated on the steel sheet 1 by pressure bonding, there are cases where the bubbles are difficult to escape. Therefore, the surface roughness Ra of the steel sheet 1 is preferably of 0.05 μm or more, and more preferably 0.10 μm or more. On the other hand, in a case where the surface roughness of the steel sheet 1 exceeds 0.80 μm in terms of average roughness Ra, bubbles are likely to be entrained along the irregularities of the surface of the steel sheet 1 when the resin film is laminated on the steel sheet 1 by pressure bonding. Therefore, the surface roughness Ra of the steel sheet 1 is preferably 0.80 μm or less, and more preferably 0.60 μm or less. The range of the surface roughness Ra of the steel sheet 1 is preferably f 0.05 μm or more and 0.80 μm or less, and more preferably 0.10 μm or more and 0.60 μm or less.

The surface of the steel sheet 1 may be subjected to a surface treatment. For example, for the purpose of improving the adhesion between the steel sheet 1 and the polyester-based film layer (the thermoplastic polyester-based resin layer) 6, a chemical conversion film formed of O and one or more elements selected from Cr, Zr, Al, Si, P, Ti, Ce, and W, and unavoidable elements may be formed on the surface of the steel sheet 1, which is on the outer surface side of a can product. The chemical conversion film formed of hydroxides and oxides of the above elements has hydroxyl groups and thus forms hydrogen bonds with the hydroxyl groups of the thermoplastic polyester resin. Therefore, the adhesion between the steel sheet 1 and the thermoplastic polyester-based resin layer 6 is improved.

As a method for forming the chemical conversion film containing one or more elements selected from Cr, Zr, Al, P, Ti, Ce, and W, a method of performing an electrolytic treatment in an aqueous solution of fluoride, nitrate, sulfate, chloride, acetate, formate, carbonate, and the like of various elements, a method using an etching reaction by immersion, and the like can be adopted. After the chemical conversion treatment, washing with water or washing with hot water is performed to remove most of the counter ion species of the above elements from the chemical conversion film. However, there are cases where a trace amount of the counter ion species remain as unavoidable elements. The counter ion species as the unavoidable elements may be present as long as the properties of the chemical conversion film are not affected.

The steel sheet may have a film formed by a silane coupling agent treatment or the like in addition to the chemical conversion film. The film formed by the silane coupling agent treatment contains a Si compound, has excellent adhesion to the steel sheet and the polyester resin, and is thus preferable.

<Film Configuration of Resin Laminate Steel Sheet>

The film configuration of the resin laminate steel sheet will be described in detail.

Regarding the resin film (PP-based resin layer) 5 on the can inner surface side of the resin laminate steel sheet 20 used for the can lid and the can bottom, that is, on the side to be in contact with the can body made of a resin, the resin layer on the side in close contact with the steel sheet is preferably (3) the modified PP layer (modified polypropylene-based resin layer) 2 which has enhanced surface activity and improved adhesion through modification with phthalic anhydride, maleic anhydride, or the like. As the resin used for the modified polypropylene-based resin layer 2, there are a maleic anhydride-modified polypropylene resin, a chlorinated polypropylene resin, and the like. It is preferable that the intermediate layer is the unmodified (2) PP layer (polypropylene-based resin layer) 3 due to compatibility with the polypropylene-based resin of the can body.

In a case where the outermost layer of the PP-based resin layer 5 on the side to be in contact with the can body 102 is a modified polypropylene-based resin, the melting point is lowered and the fusibility to the can body 102 is improved. However, when the resin laminate steel sheet 20 is manufactured, if the surface that comes into contact with a laminating roll is a modified polypropylene-based resin layer, the modified polypropylene-based resin layer is fused to the surface of the laminating roll, and a defect is likely to occur on the surface of the PP-based resin layer 5 of the resin laminate steel sheet, which is not preferable. Therefore, it is preferable that the outermost layer of the film on the side to be in contact with the can body 102 on the surface to be in contact with the laminating roll is an unmodified layer to avoid fusion of the resin to the laminating roll.

In addition, it is preferable that a heating temperature (a heating temperature of the resin laminate steel sheet 20) when the can body 102 and the can lid 100 made of a resin laminate steel sheet for a resin-metal composite container or the can bottom 101 made of a resin laminate steel sheet for a resin-metal composite container are seamed and heated is set to be lower than the melting point of the thermoplastic polyester-based resin layer 6. When the heating temperature of the resin laminate steel sheet 20 is lower than the melting point of the thermoplastic polyester-based resin layer 6, a resin-metal composite container 200 having an excellent external appearance can be obtained. It is preferable that the heating temperature (the heating temperature of the resin laminate steel sheet 20) when the can body 102 and the can lid 100 made of a resin laminate steel sheet for a resin-metal composite container or the can bottom 101 made of a resin laminate steel sheet for a resin-metal composite container are seamed and heated is set to a temperature is higher than the melting point of the polypropylene-based resin layer 3 by 20° C. or more. A fused portion 32 having high seaming strength can be formed as long as the heating temperature of the resin laminate steel sheet 20 is higher than the melting point of the polypropylene-based resin layer 3 by 20° C. or more.

The reason why the modified polypropylene-based resin is easily fused to the surface of the laminating roll can be considered as follows. The laminating roll is made of fluoro rubber, natural rubber, or the like. Therefore, in the laminating roll that has been continuously used for a long period of time at a surface temperature of 80° C. and 120° C., the natural rubber (primarily containing isoprene) is thermally deteriorated to generate an oxidized functional group, so that the laminating roll is in a state having a high surface activity. From this, it is considered that when a resin having a high surface activity, such as a modified polypropylene-based resin, is pressure-bonded to the laminating roll in a melted state, the modified polypropylene-based resin is likely to be bonded to the oxidized functional group of the thermally deteriorated natural rubber.

Therefore, it is preferable that the outermost layer of the PP-based resin layer 5 on the side to be in contact with the can body 102 is unmodified and has a lower melting point than the polypropylene-based resin. It is preferable that the melting point of the outermost layer of the PP-based resin layer 5 is set to 135° C. or higher and 150° C. or lower for fusion to the polypropylene-based resin of the can body 102 within a short period of time. In particular, the ethylene-propylene copolymer resin layer 4 made of an ethylene-propylene copolymer having a low melting point and excellent compatibility with the polypropylene-based resin of the can body 102 is preferable. The ethylene-propylene copolymer includes an ethylene component and a propylene component. The ethylene-propylene copolymer is a random copolymer.

In a case where the melting point of the ethylene-propylene copolymer resin layer 4, which is the outermost layer of the PP-based resin layer 5, is lower than 135° C., the ethylene-propylene copolymer resin layer 4 is softened when a retort sterilization treatment (at a temperature of 120° C. to 130° C.), and there are cases where the content leaks from the seamed portion. On the other hand, in a case where the melting point of the ethylene-propylene copolymer resin layer 4 exceeds 150° C., it takes time for the ethylene-propylene copolymer resin layer 4 of the seamed portion to melt, so that the adhesion of the seamed portion becomes unstable in a case where the seamed portion is fused within a short period of time, which is not preferable. Furthermore, in a case where the melting point of the ethylene-propylene copolymer resin layer 4 exceeds 150° C., the ethylene-propylene copolymer resin layer 4 may be partially crystallized and whitened during the retort treatment, which is not preferable.

The melting point of the ethylene-propylene copolymer resin layer 4 is defined as the temperature of the main endothermic peak when thermal analysis was performed with a differential scanning-type calorimeter (DSC). Here, the main endothermic peak means a peak having the largest endothermic amount. The DSC apparatus used for the melting point measurement is DSC7030 manufactured by Hitachi High-Tech Science Corporation, and measurement was performed by enclosing 5 to 8 mg of the resin in an aluminum pan and raising the temperature in a nitrogen atmosphere at a temperature rising rate of 10° C./min.

As a method of joining the polypropylene-based resin of the can body 102 and the can lid, a method of seaming the can lid 100 made of a resin laminate steel sheet for a resin-metal composite container onto the can body 102 and thereafter heating the steel sheet of the curved portion 30 of the can lid with an induction heating (IH) apparatus until the resin is melted is preferable because the fusibility between the polypropylene-based resin of the can body 102 and the PP-based resin layer 5 on the inner surface side of the can lid can be increased. The can bottom can be joined in the same manner as the can lid. When the heating temperature of the resin laminate steel sheet 20 of the can lid is higher than the melting point of the polypropylene-based resin layer 3 by 20° C. or more and lower than the melting point of the thermoplastic polyester-based resin layer 6 on the outer surface side of the can lid, the adhesion between the can lid 100 made of a resin laminate steel sheet for a resin-metal composite container and the can body 102 is good, and the outer surface side of the can lid 100 made of a resin laminate steel sheet for a resin-metal composite container is not easily damaged and is beautiful, which is preferable. The heating temperature of the resin laminate steel sheet 20 of the can bottom 101 made of a resin laminate steel sheet for a resin-metal composite container preferably has the same condition as that of the can lid.

Here, the PE proportion (sometimes referred to as the proportion of the ethylene component) of the ethylene-propylene copolymer resin layer 4 will be described below. The proportion of the ethylene component was obtained from the following confirmation experiment of the proportion of the ethylene component.

(Confirmation Experiment of Proportion of Ethylene Component)

The upper and lower limits of the amount of the ethylene component (the proportion of the ethylene component) of the ethylene-propylene copolymer in the ethylene-propylene copolymer resin layer 4 are determined by two methods including a method of performing determination by a weight reduction ratio of the can after a water-packed can is subjected to a retort treatment (can sealability determination method) and a method of aligning the same resin sheet as the polypropylene-based resin forming the can body and the PP-based resin layer 5 side of the resin laminate steel sheet 20, performing heating and pressure bonding thereon, and thereafter performing determination with a peeling strength after performing a retort treatment.

Hereinafter, a test method for determining the melting point range of the ethylene-propylene copolymer resin layer 4 and the upper and lower limit amounts of ethylene in the ethylene-propylene copolymer resin layer 4 will be specifically described.

[Production of PP-Based Resin Film]

A film attached to the can lid inner surface side of a steel sheet for a can lid and a can lid, that is, a PP-based resin film forming the PP-based resin layer was produced as follows.

A film was produced by extruding an ethylene-propylene copolymer resin (ethylene-propylene random copolymer) as a first layer (5.0 μm, ethylene component proportion 0 to 60 mass %), a polypropylene-based resin (homopolypropylene) as a second layer (intermediate layer) (10.0 μm), and a modified polypropylene-based resin (maleic acid-modified polypropylene) as a third layer (5.0 μm) at 200° C. with a three layer co-extrusion film forming apparatus.

[Production of Resin Laminate Steel Sheet]

The above-mentioned PP-based resin film (the modified polypropylene-based resin layer side was bonded to the steel sheet) and an existing PET-based resin film were rolled and pressure-bonded to be laminated on 0.2 mm thick tinfree steel heated to 250° C. to produce a laminate steel sheet for a can lid and a can bottom.

A method of evaluating the can lid according to the embodiment of the present invention and a method of evaluating the can bottom according to the embodiment of the present invention were carried out in the same manner. The method of evaluating the can lid will be described below as a representative example.

[Production of Can Lid]

The produced resin laminate steel sheet was subjected to forming so that the surface on the can inner surface side of the can lid was the PP-based resin layer side was and the can outer surface side was the thermoplastic polyester-based resin layer side.

[Production of Can]

The can bottom made of the above-mentioned resin laminate steel sheet was seamed onto a cylindrical can body (2.0 mm) made of a polypropylene-based resin so that the can inner surface side was the PP-based resin layer and the can outer surface side was the thermoplastic polyester-based resin layer, and thereafter the seamed portion was heated by an IH heating device (200° C., heating time 1.0 second) so that the PP-based resin layer of the can bottom on the can inner surface side and the polypropylene-based resin of the can body were thermally fusion-bonded together.

[Production of Can for Retort Test]

After filling the can to which the can bottom was attached with tap water up to 80% of the internal volume of the can and then seaming the can lid, the seamed portion of the can lid was heated by the IH heating device, thereby producing a can sample.

[Retort Test of Can]

The can weight of the water-packed test can thus produced was measured with an electronic balance to the number of grams with three decimal places, and the can was subjected to a retort treatment in a retort oven at 125° C. for 30 minutes.

[Method of Determining Sealability of Can]

The weight of the can subjected to the retort treatment was measured again with the electronic balance to the number of grams with three decimal places. In a case where the weight was reduced by 0.20 mass % or more, it was considered that liquid leakage had occurred and the case was regarded as being unacceptable. In a case where the weight reduction ratio was 0.05 mass % or more and less than 0.20 mass %, the weight loss was not so high that liquid leakage was determined and was determined to be acceptable. In a case where the weight reduction ratio was less than 0.05 mass %, the weight reduction ratio was within a measurement error range, so that the sealability of the can was determined to be good.

[Method of Determining Fusibility between Polypropylene Resin of Can Body and Resin Laminate Steel Sheet]

The fusibility between the polypropylene resin of the can body and the resin laminate steel sheet was determined by the following method, and the resin configuration of the film on the inner surface side of the can lid was determined.

1) Production of a sample of fusion between the polypropylene resin and the resin laminate steel sheet: A polypropylene resin sheet (E111G manufactured by Prime Polymer Co., Ltd., 2 mm thick) for the can body cut into a size of 50 mm×100 mm and the resin laminate steel sheet cut into the same size were aligned on the PP-based resin layer side of the resin laminate steel sheet and heated and pressure-bonded (10 N/cm$^2$) for 10 seconds by a hot press heated to 200° C. to heat the steel sheet such that the polypropylene resin sheet and the resin laminate steel sheet were fused.
2) Retort treatment: The produced sample was immersed in tap water and subjected to a retort treatment at 125° C. for 30 minutes.
3) Measurement of peeling strength: The sample after the retort treatment was cut into a width of 10 mm, and the T-type peeling strength was measured as a peeling strength. (tension rate=200 mm/min, measurement temperature=24° C.)
4) Determination of fusibility: A case where the peeling strength was 10 N/10 mm or more was determined to be (good), a case where the peeling strength was 5 N/10 mm or more and less than 10 N/10 mm was determined to be (acceptable), and a case where the peeling strength was less than 5 N/10 mm was determined to be (unacceptable).

By the above determination method, the optimum ranges of the proportion of the ethylene component of the ethylene-propylene copolymer in the ethylene-propylene copolymer resin layer of the resin laminate steel sheet for the can lid and the can bottom, and the melting point thereof were determined. The above test results are shown in FIG. 11 (the basis for setting the upper limit of the proportion of ethylene in the ethylene-propylene copolymer in the ethylene-propylene copolymer resin layer) and FIG. 12 (the basis for setting the lower limit of the proportion of the ethylene component in the ethylene-propylene copolymer in the ethylene-propylene copolymer resin layer).

Figure 11:
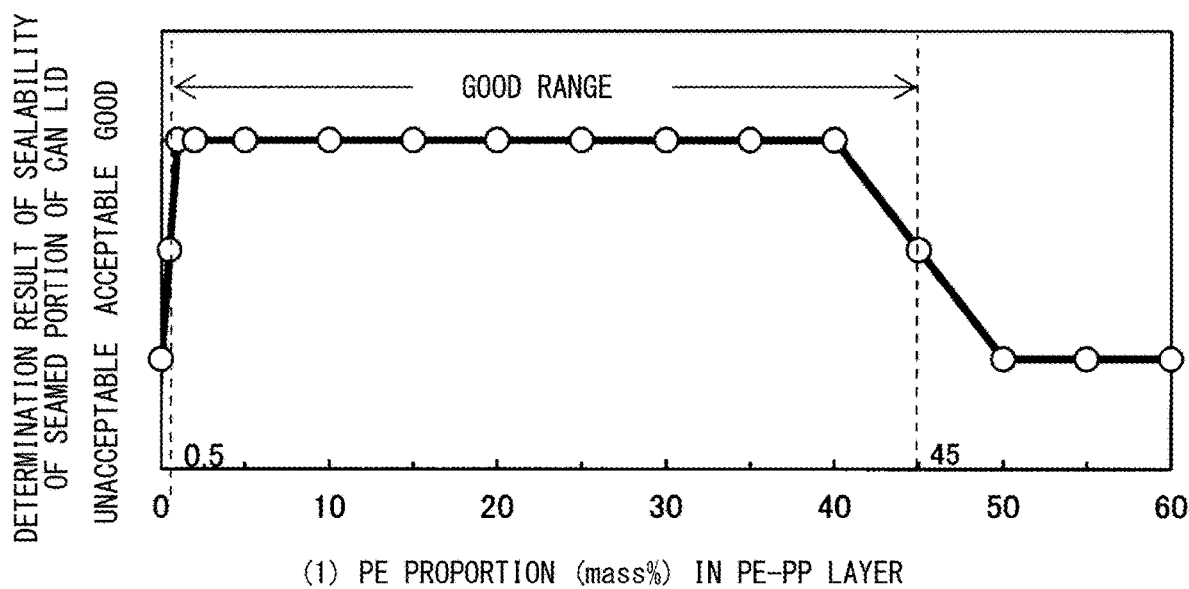
FIG. 11 is a diagram showing the proportion of a PE component in an ethylene-propylene copolymer resin layer of a resin laminate steel sheet and determination results of the sealability of a seamed portion.

The horizontal axis of FIG. 11 represents the proportion (PE proportion in the PE-PP layer) of the ethylene component in the ethylene-propylene copolymer resin layer of the PP-based resin film (ethylene-propylene copolymer resin layer/polypropylene-based resin layer/modified polypropylene-based resin layer) on the can body side of the resin laminate steel sheet forming the can lid, and the vertical axis represents the determination result of the sealability of the can in the figure.

As can be seen from FIG. 11, it was found that the sealability of the seamed portion of the can lid is good in a case where the proportion of the ethylene component in the ethylene-propylene copolymer in the ethylene-propylene copolymer resin layer of the PP-based resin layer of the can lid made of a resin laminate steel sheet is 0.5 mass % or more. In addition, it was found that the sealability of the seamed portion of the can lid is good in a case where the proportion of the ethylene component in the ethylene-propylene copolymer in the ethylene-propylene copolymer resin layer is 45.0 mass % or less. That is, it was found that a high seaming strength can be obtained within the above range. In a case where the proportion of the ethylene component is less than 0.5 mass %, if the heating time of the seamed portion is 1.0 second, the adhesion of the seamed portion is not stable and liquid leakage is likely to occur, which is not preferable. When the proportion of the ethylene component in the ethylene-propylene copolymer in the ethylene-propylene copolymer resin layer exceeds 45.0 mass %, the surface layer of the PP-based resin layer of the seamed portion is softened during the retorting and the strength decreases, so that liquid leakage is likely to occur when the internal pressure of the can is increased due to the retort treatment, which is not preferable.

In addition, when the proportion of the ethylene component in the ethylene-propylene copolymer in the ethylene-propylene copolymer resin layer exceeds 45.0 mass %, the surface layer of the film becomes soft, and irregularities are likely to be generated on the surface of the film during film lamination and cause the surface to be rough, which is not preferable.

The proportion of the ethylene component in the ethylene-propylene copolymer can be obtained, for example, by infrared micro-spectrometry. The ratio (peak intensity ratio) between a peak intensity at 974 cm$^{-1}$ and a peak intensity at 721 cm$^{-1}$ attributed to propylene is obtained from an IR spectrum obtained by measuring the ethylene-propylene copolymer in which the proportion of the ethylene component is changed, with an infrared micro-spectrometer. A calibration curve is created from the proportion of the ethylene component and the peak intensity ratio. The proportion of the ethylene component can be obtained from the peak intensity ratio of the ethylene-propylene copolymer of the ethylene-propylene copolymer resin layer 4 and the calibration curve.

Figure 12:
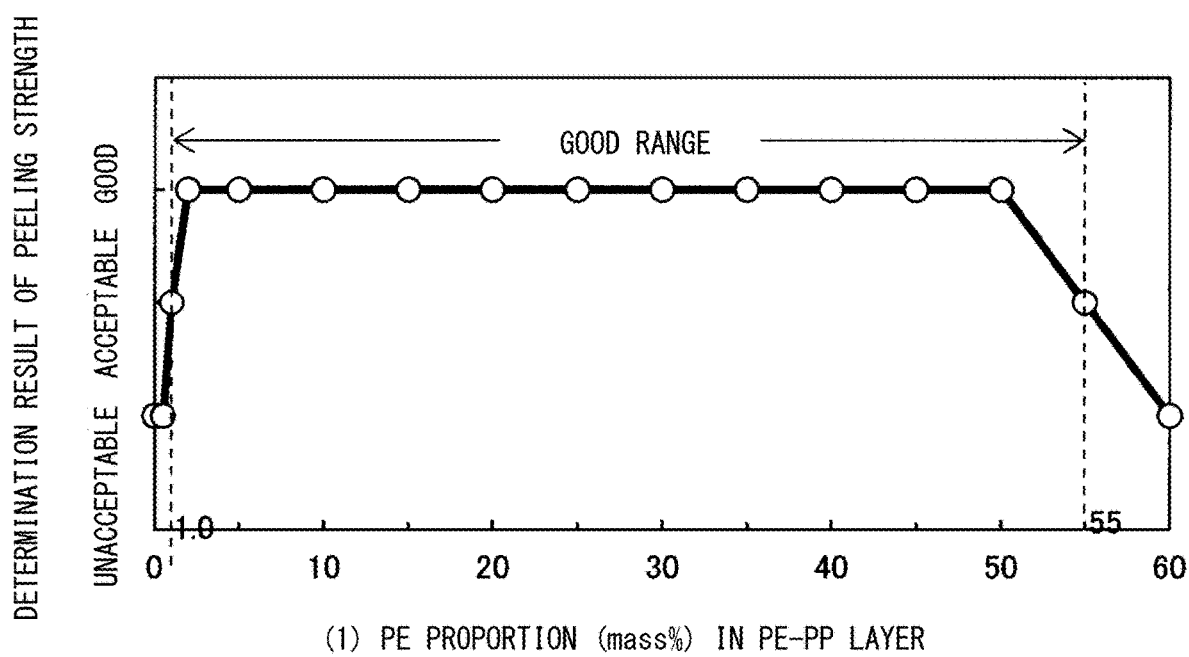
FIG. 12 is a diagram showing the proportion of the PE component in the ethylene-propylene copolymer resin layer of the resin laminate steel sheet and determination results of heat sealability.

The horizontal axis of FIG. 12 represents the proportion (PE proportion in the PE-PP layer) of the ethylene component in the ethylene-propylene copolymer in the ethylene-propylene copolymer resin layer on the PP-based resin layer side of the resin laminate steel sheet, and the vertical axis of FIG. 12 represents the determination result of the peeling strength.

As can be seen from FIG. 12, it was found that the peeling strength, which is an index of the fusibility between the can body made of a polypropylene resin and the seamed portion of the can lid, is good when the proportion of the ethylene component in the ethylene-propylene copolymer in the ethylene-propylene copolymer resin layer is in a range of 1.0 mass % or more and 55.0 mass % or less. In a case where the proportion of ethylene in the ethylene-propylene copolymer in the ethylene-propylene copolymer resin layer is less than 1.0 mass %, the peeling strength between the polypropylene resin of the can body and the resin laminate steel sheet is less than 5 N/10 mm, and the fusibility becomes unstable, which is not preferable. Furthermore, when the proportion of ethylene in the ethylene-propylene copolymer in the ethylene-propylene copolymer resin layer exceeds 55.0 mass %, softening occurs due to the retort treatment and the strength tends to decrease.

From the above determination results, the proportion of the ethylene component in the ethylene-propylene copolymer in the ethylene-propylene copolymer resin layer 4 of the resin laminate steel sheet that can achieve both the sealability and the fusibility of the seamed portion of the can lid and the can bottom is 1.0 mass % or more. The proportion of the ethylene component in the ethylene-propylene copolymer in the ethylene-propylene copolymer resin layer 4 is 45.0 mass % or less. When the proportion of the ethylene component in the ethylene-propylene copolymer is 35.0% or less, the adhesion strength of the film can be further improved. Therefore, the more preferable proportion of the ethylene component is 35.0 mass % or less.

Next, the appropriate range of the melting point of the ethylene-propylene copolymer resin layer 4 of the resin laminate steel sheet 20 will be described. The appropriate range of the melting point of the ethylene-propylene copolymer resin layer 4 was determined from the following confirmation experiment of the melting point of the ethylene-propylene copolymer resin layer.

(Confirmation Experiment of Melting Point of Ethylene-Propylene Copolymer Resin Layer)

The upper and lower limits of the melting point of the ethylene-propylene copolymer resin layer 4 are determined, as in the confirmation experiment of the proportion of the ethylene component in the ethylene-propylene copolymer, by two methods including a method of performing determination by a weight reduction ratio of the can after a water-packed can is subjected to a retort treatment (can sealability determination method) and a method of aligning the same resin sheet as the polypropylene-based resin forming the can body and the PP-based resin layer of the resin laminate steel sheet forming the can lid, performing heating and pressure bonding thereon, and thereafter performing determination with a peeling strength after performing a retort treatment. Determination was performed under the condition that only the melting point of the ethylene-propylene copolymer resin layer was changed and the other conditions were the same as in the confirmation experiment of the proportion of ethylene component. The melting point of the ethylene-propylene copolymer resin layer was changed by adjusting the proportion of the ethylene component in the ethylene-propylene copolymer in the ethylene-propylene copolymer resin layer.

Figure 13:
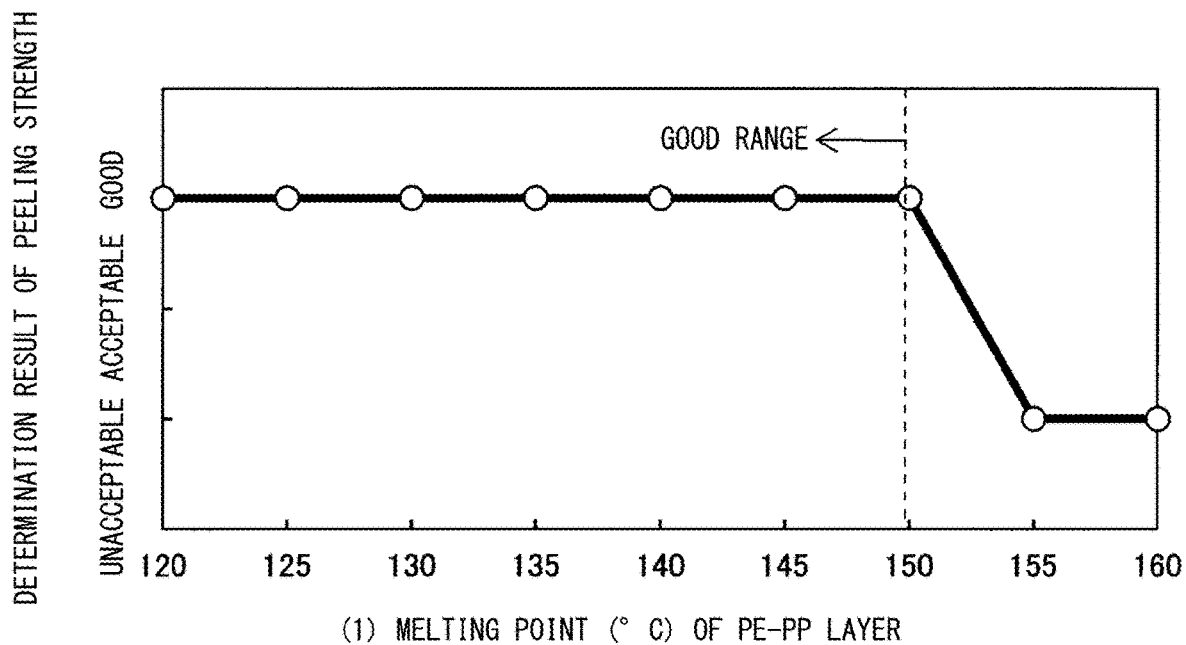
FIG. 13 is a diagram showing the melting point of the ethylene-propylene copolymer resin layer of the resin laminate steel sheet and determination results of the heat sealability.

FIG. 13 is a diagram in which the horizontal axis represents the melting point of the ethylene-propylene copolymer resin layer (the melting point of the PE-PP layer) of the resin laminate steel sheet and the vertical axis represents the determination result of the peeling strength.

As can be seen from FIG. 13, in a case where the melting point of the ethylene-propylene copolymer resin layer of the resin laminate steel sheet exceeds 150° C., good peeling strength cannot be obtained, which is not preferable.

Figure 14:
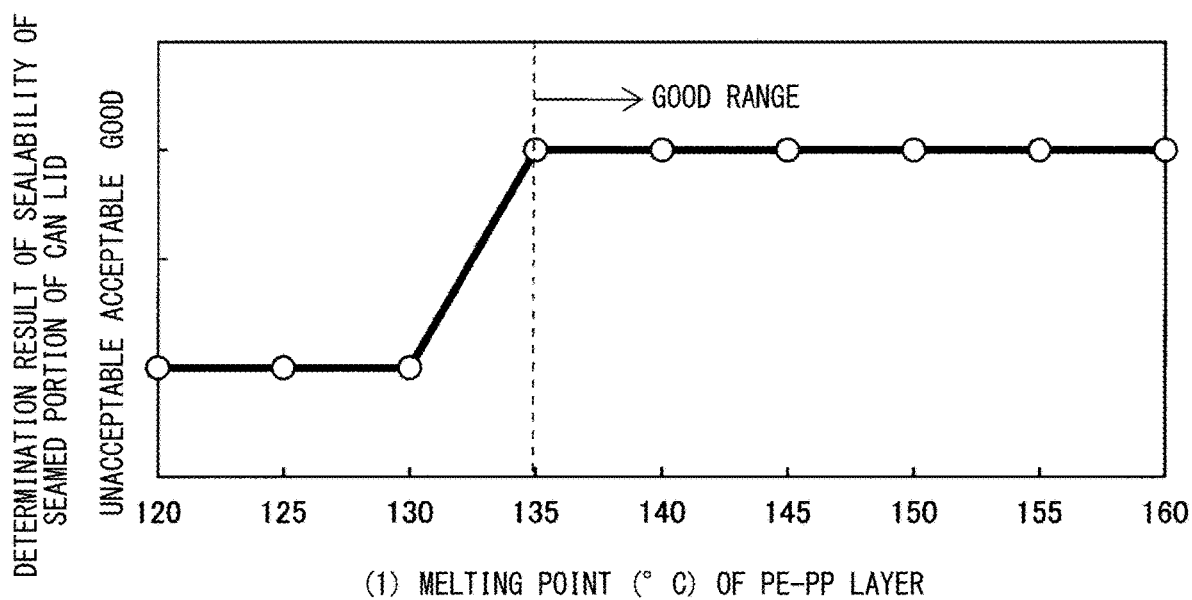
FIG. 14 is a diagram showing the melting point of the ethylene-propylene copolymer resin layer of the resin laminate steel sheet and determination results of the sealability of the seamed portion.

FIG. 14 is a diagram in which the horizontal axis represents the melting point of the ethylene-propylene copolymer resin layer (the melting point of the PE-PP layer) of the resin laminate steel sheet and the vertical axis represents the determination result of the sealability of the seamed portion.

As can be seen from FIG. 14, in a case where the melting point of the ethylene-propylene copolymer resin layer of the can lid made of a resin laminate steel sheet is lower than 135° C., the adhesion strength of the surface layer of the PP-based resin layer 5 of the seamed portion is low at the temperature during the retorting and cannot withstand an increase in the internal pressure of the can, and liquid leakage is likely to occur, which is not preferable.

From the results shown in FIGS. 13 and 14, it was found that the melting point of the ethylene-propylene copolymer resin layer of the can lid and the can bottom made of a resin laminate steel sheet is preferably 135° C. or higher. It was also found that the melting point of the ethylene-propylene copolymer resin layer of the can lid and the can bottom made of the resin laminate steel sheet is preferably 150° C. or lower.

As the ethylene-propylene copolymer resin having a melting point of the ethylene-propylene copolymer resin layer 4 of 135° C. or higher and 150° C. or lower, there is a random copolymerized ethylene-propylene copolymer.

Next, the optimum thickness range of each layer of the PP-based resin film of the can lid and the can bottom made of a resin laminate steel sheet will be shown. The average thickness of each layer of the film was determined from the following confirmation experiment of the resin thickness.

(Confirmation Experiment of Resin Thickness)

The upper and lower limits of the average thickness of the ethylene-propylene copolymer resin layer 4 will be described. The upper and lower limits of the average thickness of the ethylene-propylene copolymer resin layer 4 were determined by the can sealability determination method performed in the confirmation experiment of the proportion of the ethylene component. The conditions of the can sealability determination method were the same as in the confirmation experiment of the proportion of the ethylene component except for the film thickness of the ethylene-propylene copolymer resin layer, the melting point (150° C.) of the ethylene-propylene copolymer resin layer, and the proportion (10 mass %) of the ethylene component.

Figure 15:
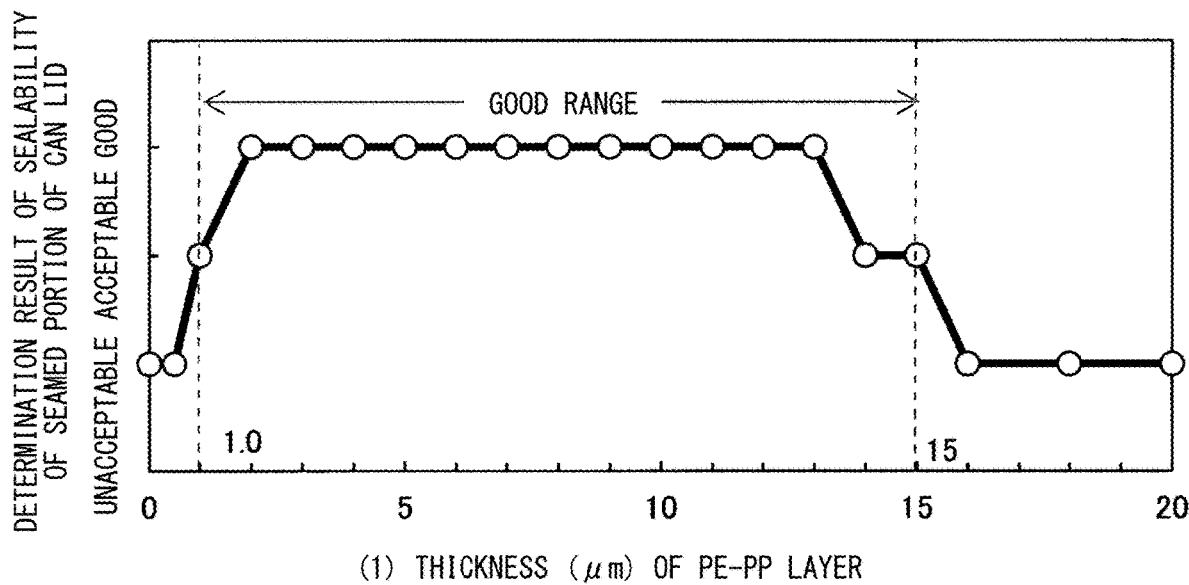
FIG. 15 is a diagram showing the thickness of the ethylene-propylene copolymer resin layer of the resin laminate steel sheet and determination results of the sealability of the seamed portion.

FIG. 15 is a diagram in which the horizontal axis represents the average thickness of the ethylene-propylene copolymer resin layer (the thickness of the PE-PP layer) of the can lid made of a resin laminate steel sheet and the vertical axis represents the determination result of the sealability of the seamed portion described above.

As can be seen from FIG. 15, the sealability of the seamed portion of the can lid of the can is good when the average thickness of the ethylene-propylene copolymer resin layer of the resin laminate steel sheet is 1.0 μm or more. In addition, as can be seen from FIG. 15, the sealability is good when the average thickness of the ethylene-propylene copolymer resin layer of the resin laminate steel sheet is in a range of 15.0 μm or less. In a case where the average thickness of the ethylene-propylene copolymer resin layer is less than 1.0 μm, the thickness of the fused layer of the seamed portion cannot be sufficiently secured within a short period of time, and stable strength cannot be obtained, which is not preferable. Further, when the average thickness of the ethylene-propylene copolymer resin layer exceeds 15.0 μm, the strength of the seamed portion itself is insufficient at the temperature during the retorting, and cannot withstand an increase in the internal pressure of the can, and liquid leakage is likely to occur, which is not preferable.

Next, regarding the polypropylene-based resin layer 3, the polypropylene-based resin layer 3 having a high melting point is preferably disposed between the ethylene-propylene copolymer resin layer and the modified polypropylene-based resin layer 2 in order to secure the strength of the seamed portion of the can lid and the can bottom during the retort treatment (temperature: 120° C. to 130° C.). As an example, a polypropylene homopolymer having a melting point of 160° C. to 165° C. can be mentioned.

In addition, in order to suppress complete melting of the polypropylene-based resin film side during the manufacturing of the resin laminate steel sheet, the average thickness of the polypropylene-based resin layer, which is an intermediate layer of the polypropylene-based resin film, is preferably 6.0 µm or more.

Figure 16:
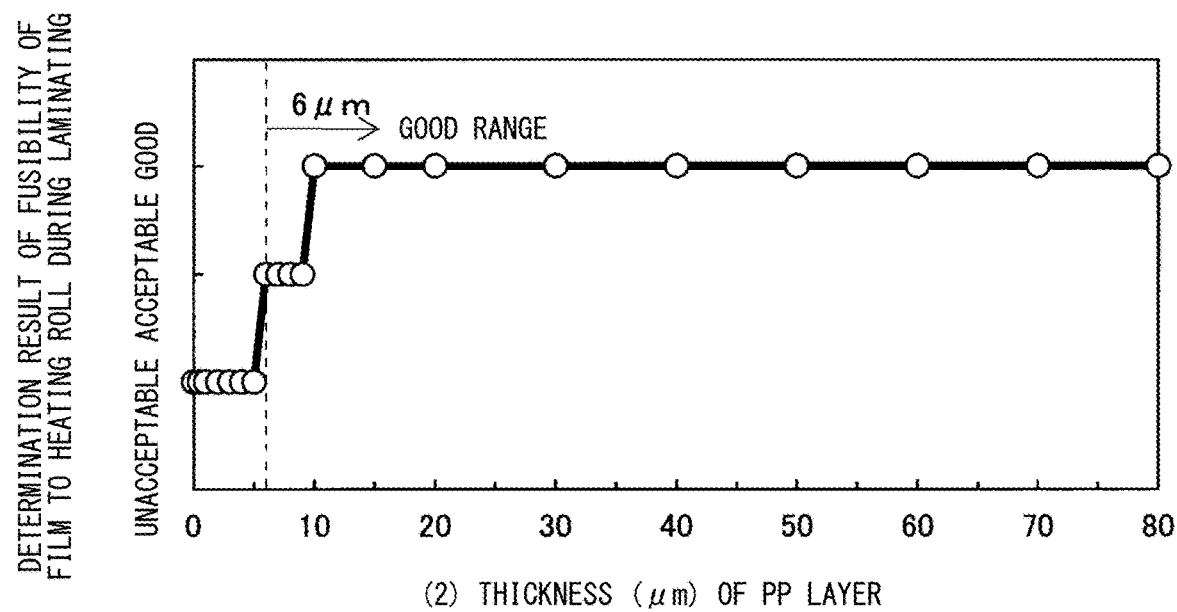
FIG. 16 is a diagram showing the thickness of a polypropylene-based resin layer of the resin laminate steel sheet and the result of determining resin fusion to a heating roll during film laminating.

FIG. 16 is a diagram showing the relationship between the determination result of the fusibility of the film to a heating roll when the PP-based resin film is laminated by a film laminating apparatus (FIG. 18) described later (the determination result of the fusibility of the film to the heating roll during lamination) and the average thickness of the polypropylene-based resin layer 3 (the thickness of the PP layer). As can be seen from FIG. 16, in a case where the average thickness of the polypropylene-based resin layer 3 is less than 6.0 there are cases where the entire polypropylene-based resin layer is melted during film lamination and the modified polypropylene-based resin layer 2 on the steel sheet side is exposed to the outermost surface and is fused to the steel sheet heating roll of the film laminating apparatus, which is not preferable. When the average thickness of the polypropylene-based resin layer 3 is 6.0 µm or more, fusion of the film to the heating roll is unlikely to occur. The average thickness of the polypropylene-based resin layer 3 is more preferably 10.0 µm or more. When the average thickness of the polypropylene-based resin layer 3 is 10.0 µm or more, the irregularities on the surface of the PP-based resin layer 5 are reduced.

The upper limit of the average thickness of the polypropylene-based resin layer 3 is not particularly limited. However, when the average thickness of the entire PP-based resin layer exceeds 100.0 µm, not only is it disadvantageous in terms of cost, but also there are cases where the can lid is not easily seamed during seaming Therefore, regarding the average thickness of the polypropylene-based resin layer 3, it is preferable that the average thickness of the polypropylene-based resin layer 3 is adjusted so that the total average thickness including the average thickness of the ethylene-propylene copolymer resin layer 4 and the average thickness of the modified polypropylene-based resin layer 2 (the total average thickness of the ethylene-propylene copolymer resin layer 4, the polypropylene-based resin layer 3, and the modified polypropylene-based resin layer 2) is about 100.0 µm or less.

Next, the upper and lower limits of the average thickness of the modified polypropylene-based resin layer 2 will be described. The upper and lower limits of the modified polypropylene-based resin layer 2 were determined by the can sealability determination method performed in the confirmation experiment of the proportion of the ethylene component. The conditions of the can sealability determination method were the same as in the confirmation experiment of the proportion of the ethylene component except for the melting point of 150° C. of the ethylene-propylene copolymer resin layer, and the proportion of 10% of the ethylene component, and the average thickness of the modified polypropylene-based resin layer.

Figure 17:
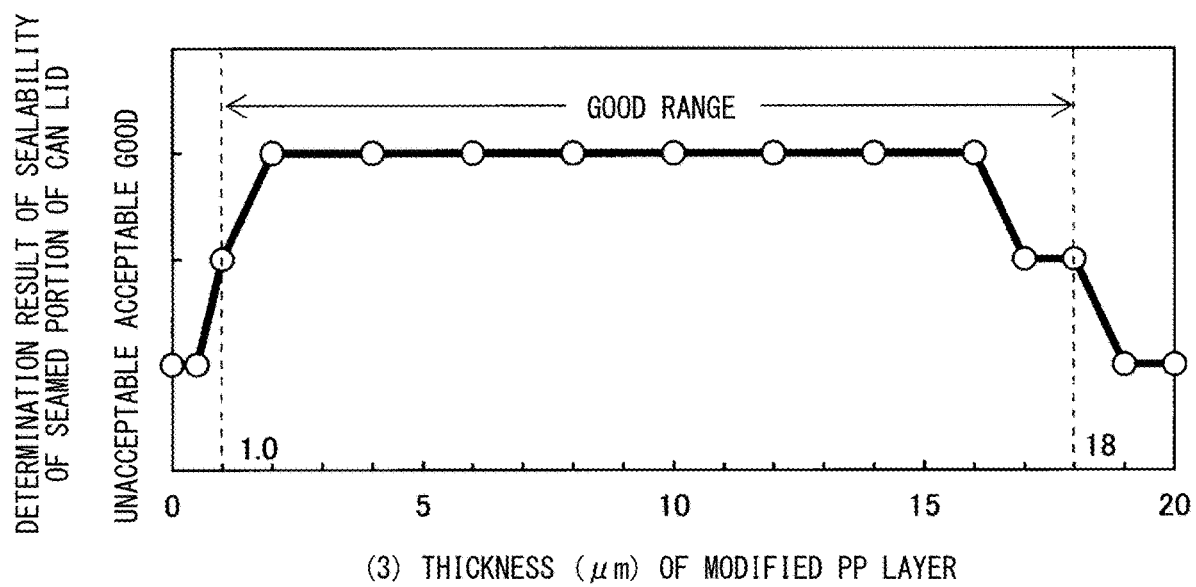
FIG. 17 is a diagram showing the thickness of a modified polypropylene-based resin layer of a resin laminate steel sheet and determination results of the sealability of the seamed portion.

FIG. 17 is a diagram in which the horizontal axis represents the average thickness of the modified polypropylene-based resin layer of the resin laminate steel sheet (the thickness of the modified PP layer) and the vertical axis represents the determination result of the sealability of the seamed portion of the can lid of the can described above.

As can be seen from FIG. 17, in a case where the average thickness of the modified polypropylene-based resin layer 2 is less than 1.0 µm, the adhesion state to the steel sheet is unstable, so that the increase in the internal pressure of the can during the retorting cannot be withstood, and liquid leakage is likely to occur, which is not preferable.

In addition, since the modified polypropylene-based resin layer 2 has a lower softening temperature than the polypropylene-based resin layer 3 and the resin softens at the retorting temperature and causes a decrease in the strength, in a case where the average thickness of the modified polypropylene-based resin layer 2 exceeds 18.0 µm there are cases where the modified polypropylene-based resin layer 2 is elongated due to an increase in the internal pressure of the can during the retorting and the heat sealed portion is peeled off and causes liquid leakage, which is not preferable.

Next, the average thickness of the entire PP-based resin film of the resin laminate steel sheet will be described.

In the case of a laminating method in which a resin film which is to be the thermoplastic polyester-based resin layer 6 and a film which is to be the PP-based resin layer 5 are thermally fusion-bonded, it is necessary that the heating temperature of the steel sheet 1 is set to be equal to or higher than the melting point of the film of the thermoplastic polyester-based resin layer 6. Therefore, the film which is to be the PP-based resin layer 5 having a low melting point melts up to the outermost layer, and the film surface is easily damaged.

Although melting depends on the degree of cooling of the laminating roll on the film side which is to be the PP-based resin layer 5, even if the laminating roll is strongly cooled, complete melting cannot be avoided in a case where the average thickness of the PP-based resin layer 5 is less than 20.0 µm. Therefore, the total average thickness of the film which is to be the PP-based resin layer 5 is preferably 20.0 µm or more. That is, the average thickness of the PP-based resin layer 5 is preferably 20.0 µm or more.

The upper limit of the average thickness of the PP-based resin layer 5 of the resin laminate steel sheet 20 is not particularly limited. However, as described above, when the average thickness is too large, not only is it disadvantageous in terms of cost, but also the can lid is not easily seamed. Therefore, the average thickness is preferably set to about 100.0 µm or less, and more preferably less than 40.0 µm. When the thickness exceeds 100.0 µm, the film is slightly difficult to cut when the can is opened. However, when the thickness is about 100.0 µm or less, the film is easily cut when the can is opened. When the thickness of the PP-based resin layer 5 is less than 40.0 µm, the film is more easily cut.

[PET Layer (Thermoplastic Polyester-Based Resin Layer)]

(5) The PET layer (thermoplastic polyester-based resin layer), which is a resin layer on the outer surface side of the resin laminate steel sheet 20 of the can lid and the can bottom of the present embodiment, will be described.

When the resin layer on the outer surface side of the can lid and the can bottom melts when coming into contact with the heating tool for sealing, there are cases where the film is damaged and the corrosion resistance is impaired. Therefore, the melting point of the thermoplastic polyester-based resin layer 6 of the can lid 100 and the can bottom 101 made of a resin laminate steel sheet for a resin-metal composite container is preferably higher than the temperature of the heating tool for sealing in order to obtain the can 200 having an excellent external appearance. Specifically, the heating tool for sealing is heated to a temperature equal to or higher than the melting point of the PP-based resin layer 5 in order to fuse the resin of the seamed portion. Therefore, the melting point of the thermoplastic polyester-based resin layer 6 is preferably higher than the melting point of the PP-based resin layer 5, and in particular, the melting point of the thermoplastic polyester-based resin layer 6 is higher than the melting point of the polypropylene-based resin layer 3 having the highest melting point in the PP-based resin layers 5 by 40° C. or more. In a case where the thermoplastic polyester-based resin layer 6 is higher than the melting point of the polypropylene-based resin layer 3 by 40° C. or more, when the can lid made of a resin laminate steel sheet for a resin-metal composite container or the can bottom 101 made of a resin laminate steel sheet for a resin-metal composite container and the can body 102 are seamed and fused together, even if the heating tool for sealing comes into contact with the resin layer on the outer surface side, the case where the film is damaged can be reduced.

As a method of seaming and fusing the can body 102 made of the PP resin and the can lid and the can bottom, in addition to a method of pressing the heating tool against the can lid and the can bottom, a method of locally heating and melting the resin of the seamed portion by performing electromagnetic induction heating on the steel sheet of the can lid and the can bottom made of a resin laminate steel sheet by IH heating is preferable because the film is less likely to be damaged due to the heating tool coming into contact with the film.

Since the resin layer on the outer surface side of the resin laminate steel sheet 20 of the can lid and the can bottom is particularly excellent in workability, adhesion, corrosion resistance, hygiene, and flavor retention, a thermoplastic polyester-based resin film is preferable.

The resin of the thermoplastic polyester-based resin layer 6 may be a stretched film or an unstretched film, and is not particularly limited. However, a stretched film is superior in corrosion resistance and strength to an unstretched film, is less expensive than an unstretched film, and is thus more preferable.

Examples of the resin of the thermoplastic polyester-based resin layer 6 include a copolymer polyester mainly containing ethylene terephthalate units and containing, in addition to the ethylene terephthalate units, ethylene isophthalate units or butylene terephthalate units as a copolymer component, and a mixture of polyethylene terephthalate and a polyethylene terephthalate-isophthalate copolymer or a polyethylene terephthalate-butylene terephthalate copolymer.

Regarding the proportions of the ethylene terephthalate units and the ethylene isophthalate units, it is preferable that the ethylene isophthalate units occupy 12 mol % or less of the entire polyester-based film (thermoplastic polyester-based resin layer) 6. In a case where the proportion of the polyethylene isophthalate units in the polyester-based film (thermoplastic polyester-based resin layer) 6 exceeds 12 mol %, the crystallinity of an oriented crystal layer decreases, so that there are cases where the moisture permeability of the film increases and the corrosion resistance decreases.

As the resin of the thermoplastic polyester-based resin layer 6, specifically, there are polyethylene terephthalate, a copolymer of ethylene terephthalate and ethylene isophthalate (IA-PET), a copolymer of polyethylene terephthalate and polybutylene terephthalate (PET-PBT), a copolymer of polyethylene terephthalate and cyclohexanedimethanol (PETG), and mixtures thereof.

The resin film which is to be the thermoplastic polyester-based resin layer 6 on the outer surface side of the can may be a single layer or a multilayer structure of two layers or three layers. In the case of a multilayer structure, the kinds of resins of the layers may be different.

The average thickness of the thermoplastic polyester-based resin layer 6 of the resin laminate steel sheet 20 is not particularly limited, but may be about 30.0 µm or less because the thermoplastic polyester-based resin layer 6 is on the outer surface side of the can lid and the can bottom and does not particularly require corrosion resistance. The lower limit of the thickness of the thermoplastic polyester-based resin layer 6 is not particularly limited, but is preferably 10.0 µm or more because if the thickness is too small, film wrinkles are likely to occur in the laminate when the laminated steel sheet is manufactured.

For the purpose of coloring the outer surfaces of the lid and the bottom, a coloring pigment or dye such as titanium white or carbon black may be mixed and dispersed in the thermoplastic polyester-based resin.

Moreover, even if inorganic particles such as silica are mixed and dispersed in the thermoplastic polyester-based resin film for the purpose of preventing the blocking of the film, the effect of the present invention is not impaired.

<Method of Manufacturing Resin Laminate Steel Sheet>

Figure 18:
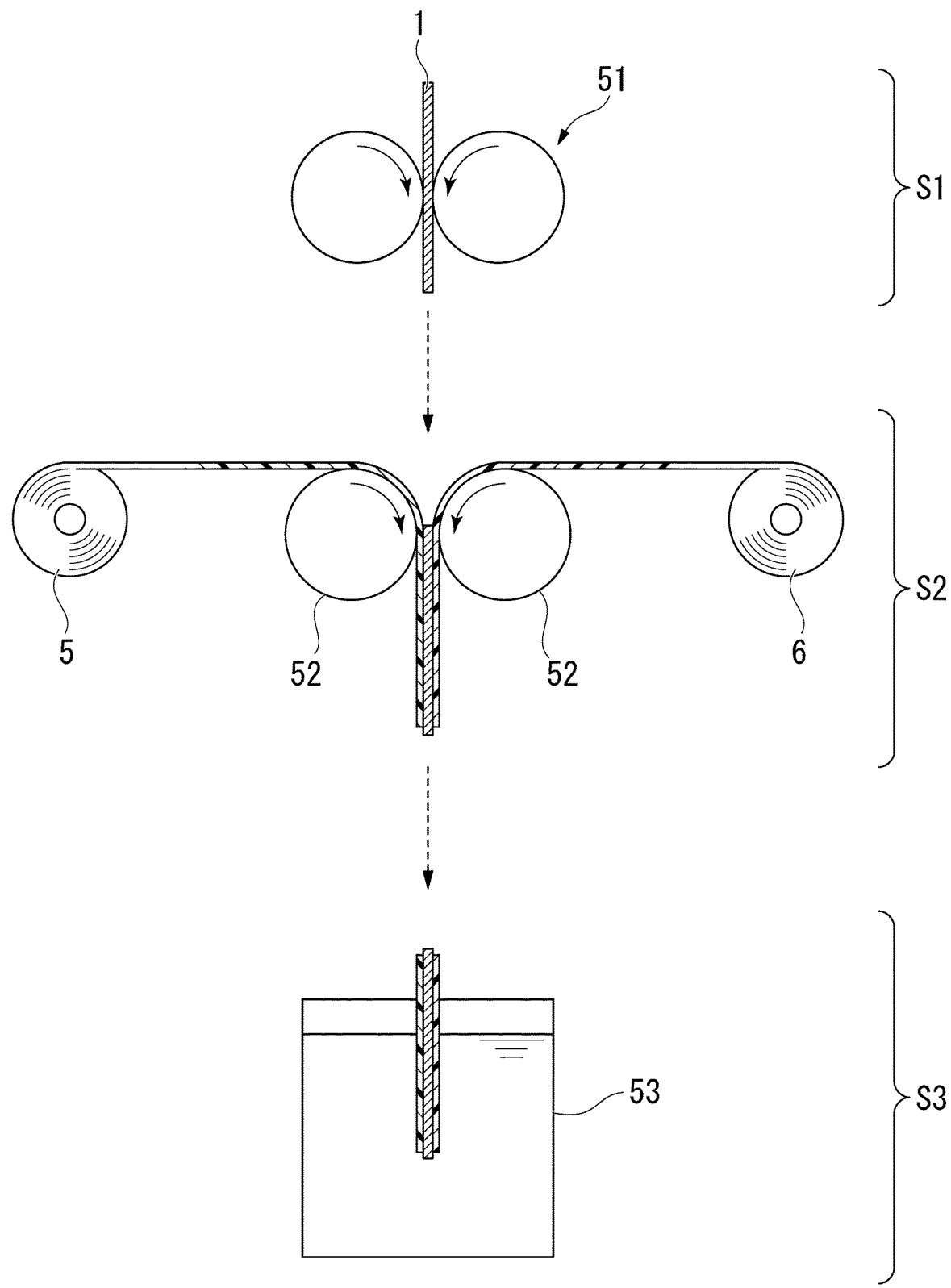
FIG. 18 is a diagram showing an example of a film laminating method for the resin laminate steel sheet.
Figure 19:
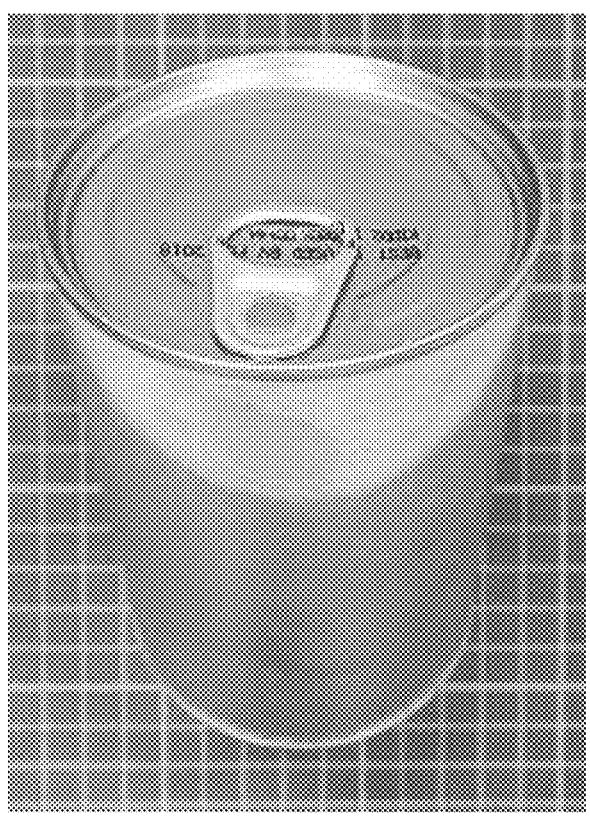
FIG. 19 is an example of the external appearance of a resin-metal composite container in the related art.

Regarding the resin laminate steel sheet 20 for the can lid 100 and the can bottom 101 made of a resin laminate steel sheet for a resin-metal composite container according to the present embodiment, the resin film is pressure-bonded onto a known steel sheet heated by a resin film laminating apparatus as illustrated in FIG. 18, for example, a heating roll 51, by a film laminating roll 52, to thermally fusion-bond the resin film, and then the resin laminate steel sheet is cooled to a predetermined temperature in a cooling tank 53, whereby a resin film layer structure which is uniform in width and length directions can be formed, and bubbles entrained between steel sheet and the resin film can be reduced.

As a method of heating the steel sheet of the resin film laminating apparatus in a heating step S1, there is a method of passing and heating the steel sheet through a jacket roll heated by passing a plurality of mediums such as steams through the inside of the roll or a heating roll having a heater embedded therein.

As the film laminating roll 52 in a laminating step S2, a rubber roll is preferable because an appropriate nip length can be secured at a film laminate portion. As a material of the rubber roll, rubber having high heat resisting properties such as fluorine rubber and silicon rubber is particularly preferable.

It is preferable that after the film is thermally fusion-bonded to the steel sheet by the above method, the resin laminate steel sheet is immediately cooled to a temperature lower than the crystallization temperature of the polyester-based resin film on the can inner surface side by a method such as water cooling, air-water cooling, or cold air (cooling step S3).

<Production of Can Lid and Can Bottom>

The can lid and the can bottom may be produced by the same method as forming of a normal can lid and a can bottom and may be formed so that the can outer surface side of the resin laminate steel sheet is the thermoplastic polyester-based resin layer 6 and the inner surface side thereof is the PP-based resin layer 5. For the purpose of preventing surface defects or cracking during forming, wax may be applied to the surface of the resin laminate steel sheet 20 in advance during the manufacturing of the resin laminate steel sheet 20. As a method of applying the wax, there is a method of heating and melting solid wax and applying the wax with a roll coater, or a solution in which wax is dissolved in a solvent may be applied to the surface of a steel sheet with a roll coater or curtain coater and dried.

A method of normally seaming the can body 102 made of a PP resin and the can lid and the can bottom and then heating the steel sheet of the seamed portion of the can lid with the induction heating (IH) apparatus until the resin is melted is preferable because the fusibility between the polypropylene-based resin of the can body 102 and the polypropylene-based resin on the can inner surface side is high. It is preferable that the heating temperature of the resin laminate steel sheet 20 on the can lid 100 and the can bottom 101 side made of a resin laminate steel sheet for a resin-metal composite container is higher than the melting point of the polypropylene-based resin layer 3 by 20° C. or more and lower than the melting point of the thermoplastic polyester-based resin layer 6 on the outer surface side of the can lid by 10° C. or lower because the adhesion between the can lid and the body is good and the outer surface side of the can lid is not easily damaged and is beautiful.

As another method, the seamed portion of the can lid and the can bottom may be brought into contact with the heating tool, and may be pressurized at a tool temperature of 160° C. to 220° C. in a range of 0.5 seconds to 1 minute. In a case where the tool temperature is lower than 160° C., the degree of fusion of the heat sealed portion tends to be non-uniform, which is not preferable. When the tool temperature exceeds 220° C., there are cases where the thermoplastic polyester-based resin layer 6 of the can lid and the can bottom softens and become a defect, which is not preferable. Furthermore, when the tool temperature is too high, the resin in the fused portion protrudes and the resin thickness in the sealed portion becomes small, which is not preferable.

The can lid and the can bottom made of a resin laminate steel sheet for a resin-metal composite container of the present invention can obtain high seaming strength with the polypropylene-based resin forming the can body 102 by heating for a short period of time, has a seamed portion strength at which an equivalent retort sterilization treatment to that for a metal can is possible, and is thus extremely useful as a can lid and a can bottom for a resin-metal composite container. In addition, since the film is not fused to the laminating roll during the manufacturing of the resin laminate steel sheet of the can, the film is excellent in manufacturability and surface quality, and is extremely excellent as a material for a can.

(Method of Manufacturing Resin-Metal Composite Container)

As illustrated in FIGS. 4, 8, and 9, the resin-metal composite container (can) 200 according to the present embodiment is manufactured by seaming the can lid 100 and the can bottom 101 made of a resin laminate steel sheet for a resin-metal composite container according to the present embodiment onto the can body 102.

Specifically, the can lid 100 made of a resin laminate steel sheet for a resin-metal composite container is placed on the upper edge of the can body 102, and the curved portion 30 of the can lid 100 made of a resin laminate steel sheet for a resin-metal composite container is seamed, thereby forming the first seamed portion 21. After forming the first seamed portion 21, the curved portion 30 is heated by induction heating or the like to melt the polypropylene-based resin of the can body 102 and the resin of the PP-based resin layer 5 of the can lid 100 made of a resin laminate steel sheet for a resin-metal composite container to be fused together, thereby forming the first fused portion 23. In the same manner as the can lid 100 made of a resin laminate steel sheet for a resin-metal composite container, in the can bottom 101 made of a resin laminate steel sheet for a resin-metal composite container, the curved portion 30 of the can bottom 101 made of a resin laminate steel sheet for a resin-metal composite container and the can body 102 are seamed, thereby forming the second seamed portion 22. After forming the second seamed portion 22, the curved portion 30 is heated by induction heating or the like to melt the polypropylene-based resin of the can body 102 and the resin of the PP-based resin layer 5 of the can lid 100 made of a resin laminate steel sheet for a resin-metal composite container to be fused together, thereby forming the second fused portion 24. By fusing the can lid 100 and the can bottom 101 made of a resin laminate steel sheet for a resin-metal composite container to the can body 102 as described above, the resin-metal composite container 200 is obtained. While the example in which the can body 102 is fused to the can lid 100 and the can bottom 101 made of a resin laminate steel sheet for a resin-metal composite container has been described above, depending on the shape of the can body 102, only the can lid 100 made of a resin laminate steel sheet for a resin-metal composite container and the can bottom 101 made of a resin laminate steel sheet for a resin-metal composite container may be fused to produce the resin-metal composite container 200.

Examples

The can lid and the can bottom made of resin laminate steel sheet for a resin-metal composite container of the present invention will be specifically described with reference to examples.

However, the conditions in the examples are one example adopted to confirm the feasibility and effects of the present invention, and the present invention is not limited to the following examples. Modifications can be made as appropriate within a range that can be adapted to the gist without departing from the gist of the present invention as long as the object of the present invention is achieved. Therefore, the present invention can adopt various conditions, all of which are included in the technical features of the present invention.

Through examples and comparative examples, the contents of (4) the steel sheet, which is a constituent material of the resin laminate steel sheet which is to be the material of the can lid and can bottom made of a resin laminate steel sheet for a resin-metal composite container, are shown in Table 1, the contents of the ethylene-propylene copolymer resin layer, the polypropylene-based resin layer, and the modified polypropylene-based resin layer of the PP-based resin layer are shown in Tables 2-1 and 2-2, and the contents of the thermoplastic polyester-based resin layer on the opposite surface are shown in Table 3. Underlines in Tables 2-1 and 2-2 indicate outside the range of the present invention.

Tables 4-1, 4-2, 4-3, 4-4, 4-5, 4-6, 4-7, 4-8, and 4-9 show the configuration and manufacturing conditions of the resin laminate steel sheet, the roughness of the PP-based resin layer surface during the manufacturing of the resin laminate steel sheet, results of visual determination of whether or not the PP-based resin layer was fused to the heating roll of the laminating apparatus, hot press conditions (temperature, welding pressure, and pressurization time) during the manufacturing of a test piece for determining heat sealability between the PP resin and the resin laminate steel sheet, the peeling strength of the test piece for determining heat sealability, and results of a test for determining sealability of the seamed portion of the can. Underlines in Tables 4-1, 4-2, 4-3, 4-4, 4-5, 4-6, 4-7, 4-8 and 4-9 indicate outside the range of the present invention.

TABLE 1

| Symbol | Metal sheet | Thickness (mm) | Kind of plating, plating amount | Treatment contents | Chemical conversion film Kind of film | Adhered amount ($mg/m^2$) |
|---|---|---|---|---|---|---|
| M1 | Steel sheet | 0.20 | Metal Cr: 80 ($mg/m^2$) | Chromic anhydride cathode electrolytic treatment (tinfree steel) | Cr oxides and hydroxides | 10 |
| M2 | Steel sheet | 0.20 | Sn-Fe alloy: 1.3 ($g/m^2$) Metal Sn: 1.5 ($g/m^2$) | Chromic anhydride cathode electrolytic treatment | Cr oxides and hydroxides | 8 |
| M3 | Steel sheet | 0.20 | Sn-Fe alloy: 1.3 ($g/m^2$) Metal Sn: 1.5 ($g/m^2$) | Zinc fluoride cathode electrolytic treatment | Zr oxides and hydroxides | 5 |
| M4 | Steel sheet | 0.20 | Sn-Fe alloy: 1.3 ($g/m^2$) Metal Sn: 1.5 ($g/m^2$) | Titanium fluoride cathode electrolytic treatment | Ti oxides and hydroxides | 5 |

TABLE 2-1

| | Film configuration | | | | | |
|---|---|---|---|---|---|---|
| | Ethylene-propylene copolymer resin layer (surface side) | | | | Polypropylene-based resin layer | |
| Symbol | Resin configuration | Melting point (° C.) | Thickness (μm) | Resin configuration | Melting point (° C.) | |
| P1 | PE-PP copolymer resin (PF proportion 1.0 mass %) | 150 | 1.0 | PP resin | 160 | |
| P2 | PE-PP copolymer resin (PE proportion 1.0 mass %) | 150 | 1.0 | PP resin | 160 | |
| P3 | PE-PP copolymer resin (PE proportion 1.0 mass %) | 150 | 1.0 | PP resin | 160 | |
| P4 | PE-PP copolymer resin (PE proportion 1.0 mass %) | 150 | 10.0 | PP resin | 160 | |
| P5 | PE-PP copolymer resin (PE proportion 1.0 mass %) | 150 | 10.0 | PP resin | 160 | |
| P6 | PE-PP copolymer resin (PE proportion 1.0 mass %) | 150 | 15.0 | PP resin | 160 | |
| P7 | PE-PP copolymer resin (PE proportion 1.0 mass %) | 150 | 15.0 | PP resin | 160 | |
| P8 | PE-PP copolymer resin (PE proportion 1.0 mass %) | 150 | 15.0 | PP resin | 160 | |
| P9 | PE-PP copolymer resin (PE proportion 45.0 mass %) | 135 | 1.0 | PP resin | 160 | |
| P10 | PE-PP copolymer resin (PE proportion 45.0 mass %) | 135 | 1.0 | PP resin | 160 | |
| P11 | PE-PP copolymer resin (PE proportion 45.0 mass %) | 135 | 1.0 | PP resin | 160 | |
| P12 | PE-PP copolymer resin (PE proportion 45.0 mass %) | 135 | 10.0 | PP resin | 160 | |
| P13 | PE-PP copolymer resin (PE proportion 45.0 mass %) | 135 | 10.0 | PP resin | 160 | |
| P14 | PE-PP copolymer resin (PE proportion 45.0 mass %) | 135 | 15.0 | PP resin | 160 | |
| P15 | PE-PP copolymer resin (PE proportion 45.0 mass %) | 135 | 15.0 | PP resin | 160 | |
| P16 | PE-PP copolymer resin (PE proportion 45.0 mass %) | 135 | 15.0 | PP resin | 160 | |
| P17 | PE-PP copolymer resin (PE proportion 1.0 mass %) | 150 | <u>0.8</u> | PP resin | 160 | |
| P18 | PE-PP copolymer resin (PE proportion 1.0 mass %) | 150 | <u>16.0</u> | PP resin | 160 | |
| P19 | PE-PP copolymer resin (PE proportion 45.0 mass %) | 135 | <u>0.8</u> | PP resin | 160 | |
| P20 | PE-PP copolymer resin (PE proportion 45.0 mass %) | 135 | <u>16.0</u> | PP resin | 160 | |

| | Film configuration | | | | |
|---|---|---|---|---|---|
| | Polypropylene-based resin layer | Modified polypropylene-based resin layer (steel sheet side) | | | |
| Symbol | Thickness (μm) | Resin configuration | Melting point (° C.) | Thickness (μm) | Total film thickness (μm) |
| P1 | 15.0 | Maleic anhydride-modified PP resin | 83 | 1.0 | <u>17.0</u> |
| P2 | 15.0 | Maleic anhydride-modified PP resin | 83 | 10.0 | <u>26.0</u> |
| P3 | 15.0 | Maleic anhydride-modified PP resin | 83 | 18.0 | 34.0 |
| P4 | 6.0 | Maleic anhydride-modified PP resin | 83 | 10.0 | 26.0 |
| P5 | <u>5.0</u> | Maleic anhydride-modified PP resin | 83 | 10.0 | 25.0 |
| P6 | <u>15.0</u> | Maleic anhydride-modified PP resin | 83 | 1.0 | 31.0 |
| P7 | 15.0 | Maleic anhydride-modified PP resin | 83 | 10.0 | 40.0 |
| P8 | 15.0 | Maleic anhydride-modified PP resin | 83 | 18.0 | 48.0 |
| P9 | 15.0 | Maleic anhydride-modified PP resin | 83 | 1.0 | <u>17.0</u> |
| P10 | 15.0 | Maleic anhydride-modified PP resin | 83 | 10.0 | <u>26.0</u> |
| P11 | 15.0 | Maleic anhydride-modified PP resin | 83 | 18.0 | 34.0 |
| P12 | 6.0 | Maleic anhydride-modified PP resin | 83 | 10.0 | 26.0 |
| P13 | <u>5.0</u> | Maleic anhydride-modified PP resin | 83 | 10.0 | 25.0 |
| P14 | <u>15.0</u> | Maleic anhydride-modified PP resin | 83 | 1.0 | 31.0 |
| P15 | 15.0 | Maleic anhydride-modified PP resin | 83 | 10.0 | 40.0 |

TABLE 2-1-continued

| | | | | | |
|---|---|---|---|---|---|
| P16 | 15.0 | Maleic anhydride-modified PP resin | 83 | 18.0 | 48.0 |
| P17 | 15.0 | Maleic anhydride-modified PP resin | 83 | 10.0 | 25.8 |
| P18 | 15.0 | Maleic anhydride-modified PP resin | 83 | 10.0 | 41.0 |
| P19 | 15.0 | Maleic anhydride-modified PP resin | 83 | 10.0 | 25.8 |
| P20 | 15.0 | Maleic anhydride-modified PP resin | 83 | 10.0 | 41.0 |

TABLE 2-2

| | Film configuration | | | | |
|---|---|---|---|---|---|
| | Ethylene-propylene copolymer resin layer (surface side) | | | Polypropylene-based resin layer | |
| Symbol | Resin configuration | Melting point (° C.) | Thickness (μm) | Resin configuration | Melting point (° C.) |
| P21 | PE-PP copolymer resin (PF proportion 1.0 mass %) | 150 | 10.0 | PP resin | 160 |
| p22 | PE-PP copolymer resin (PE proportion 1.0 mass %) | 150 | 10.0 | PP resin | 160 |
| P23 | PE-PP copolymer resin (PE proportion 45.0 mass %) | 135 | 10.0 | PP resin | 160 |
| P24 | PE-PP copolymer resin (PE proportion 45.0 mass %) | 135 | 10.0 | PP resin | 160 |
| P25 | PE-PP copolymer resin (PE proportion 45.0 mass %) | 135 | 10.0 | PP resin | 160 |
| P26 | PE-PP copolymer resin (PE proportion 45.0 mass %) | 135 | 5.0 | PP resin | 160 |
| P27 | PE-PP copolymer resin (PE proportion 45.0 mass %) | 135 | 3.0 | PP resin | 160 |
| P28 | PE-PP copolymer resin (PE proportion 45.0 mass %) | 135 | 2.0 | PP resin | 160 |
| P29 | PE-PP copolymer resin (PE proportion 0.8 mass %) | 153 | 10.0 | PP resin | 160 |
| P30 | PE-PP copolymer resin (PE proportion 46.0 mass %) | 134 | 10.0 | PP resin | 160 |
| P31 | PE-PP block copolymer resin (PE proportion 25.0 mass %) | 155 | 10.0 | PP resin | 160 |
| P32 | PE blend PP resin (PE proportion 25.0 mass %) | 138 | 10.0 | PP resin | 160 |
| P33 | PE resin | 120 | 10.0 | PP resin | 160 |
| P34 | PE-PP copolymer resin (PE proportion 25.0 mass %) | 143 | 10.0 | PP resin | 162 |
| P35 | Maleic anhydride modified PP resin | 83 | 10.0 | PP resin | 160 |
| P36 | PE-PP copolymer resin (PE proportion 35.0 mass %) | 140 | 10.0 | PP resin | 160 |
| P37 | PE-PP copolymer resin (PE proportion 30.0 mass %) | 141 | 10.0 | PP resin | 160 |
| P38 | PE-PP copolymer resin (PE proportion 20.0 mass %) | 144 | 10.0 | PP resin | 160 |
| P39 | PE-PP copolymer resin (PE proportion 15.0 mass %) | 146 | 10.0 | PP resin | 160 |

| | Film configuration | | | |
|---|---|---|---|---|
| | Polypropylene-based resin layer | Modified polypropylene-based resin layer (steel sheet side) | | |
| Symbol | Thickness (μm) | Resin configuration | Melting point (° C.) | Thickness (μm) | Total film thickness (μm) |
| P21 | 15.0 | Maleic anhydride-modified PP resin | 83 | 0.8 | 25.8 |
| p22 | 15.0 | Maleic anhydride-modified PP resin | 83 | 19.0 | 44.0 |
| P23 | 15.0 | Maleic anhydride-modified PP resin | 83 | 0.8 | 25.8 |
| P24 | 15.0 | Maleic anhydride-modified PP resin | 83 | 19.0 | 44.0 |
| P25 | 80.0 | Maleic anhydride-modified PP resin | 83 | 10.0 | 100.0 |
| P26 | 15.0 | Maleic anhydride-modified PP resin | 83 | 5.0 | 25.0 |
| P27 | 15.0 | Maleic anhydride-modified PP resin | 83 | 2.0 | 20.0 |
| P28 | 15.0 | Maleic anhydride-modified PP resin | 83 | 2.0 | 19.0 |
| P29 | 15.0 | Maleic anhydride-modified PP resin | 83 | 5.0 | 30.0 |
| P30 | 15.0 | Maleic anhydride-modified PP resin | 83 | 5.0 | 30.0 |
| P31 | 15.0 | Maleic anhydride-modified PP resin | 83 | 5.0 | 30.0 |
| P32 | 15.0 | Maleic anhydride-modified PP resin | 83 | 5.0 | 30.0 |
| P33 | 15.0 | Maleic anhydride-modified PP resin | 83 | 5.0 | 30.0 |
| P34 | 15.0 | Maleic anhydride-modified PP resin | 83 | 10.0 | 35.0 |
| P35 | 20.0 | Maleic anhydride-modified PP resin | 83 | 5.0 | 35.0 |
| P36 | 20.0 | Maleic anhydride-modified PP resin | 83 | 5.0 | 35.0 |
| P37 | 20.0 | Maleic anhydride-modified PP resin | 83 | 5.0 | 35.0 |
| P38 | 20.0 | Maleic anhydride-modified PP resin | 83 | 5.0 | 35.0 |
| P39 | 20.0 | Maleic anhydride-modified PP resin | 83 | 5.0 | 35.0 |

TABLE 3

| Symbol | Film contents | Intrinsic viscosity IV | Glass transition temperature Tg (° C.) | Crystallization temperature Tc (° C.) | Melting point Tm (° C.) | Heat shrinkage (%) | Thickness (μm) | Elongation (%) |
|---|---|---|---|---|---|---|---|---|
| E1 | Stretched HOMO-PET film | 0.60 | 70 | 150 | 252 | 10 | 19 | 110 |
| E2 | Stretched IA (12 mol %)-PET film | 0.60 | 68 | 125 | 227 | 5 | 19 | 150 |

TABLE 3-continued

| Symbol | Film contents | Intrinsic viscosity IV | Glass transition temperature Tg (° C.) | Crystallization temperature Tc (° C.) | Melting point Tm (° C.) | Heat shrinkage (%) | Thickness (μm) | Elongation (%) |
|---|---|---|---|---|---|---|---|---|
| E3 | Stretched PET-PBT (50 mass %) film | 0.60 | 65 | 150 | 213 | 5 | 12 | 130 |
| E4 | Unstretched PET-based film | 0.65 | 65 | 150 | 203 | 0 | 20 | 300 |

TABLE 4-1

Configuration of resin laminate steel sheet and film surface external appearance during laminating

| Experiment No. | Steel sheet | Film combination PP-base resin layer | Film combination Thermoplastic polyester-based resin layer | Laminating temperature (° C.) | Difference in melting point between polypropylene-based resin layer and thermoplastic polyester-based resin layer (° C.) | Presence or absence of surface roughness during laminating of PP-based resin layer | Presence or absence of fusion of resin to laminating roll |
|---|---|---|---|---|---|---|---|
| 1 | M1 | P1 | E1 | 265 | 92 | Present | Present |
| 2 | M1 | P2 | E1 | 265 | 92 | Absent | Absent |
| 3 | M1 | P3 | E1 | 265 | 92 | Absent | Absent |
| 4 | M1 | P4 | E1 | 265 | 92 | Absent | Absent |
| 5 | M1 | P5 | E1 | 265 | 92 | Present | Present |
| 6 | M1 | P6 | E1 | 265 | 92 | Absent | Absent |
| 7 | M1 | P7 | E1 | 265 | 92 | Absent | Absent |
| 8 | M1 | P8 | E1 | 265 | 92 | Absent | Absent |
| 9 | M1 | P9 | E1 | 265 | 92 | Present | Present |
| 10 | M1 | P10 | E1 | 265 | 92 | Absent | Absent |
| 11 | M1 | P11 | E1 | 265 | 92 | Absent | Absent |
| 12 | M1 | P12 | E1 | 265 | 92 | Absent | Absent |
| 13 | M1 | P13 | E1 | 265 | 92 | Present | Present |
| 14 | M1 | P14 | E1 | 265 | 92 | Absent | Absent |
| 15 | M1 | P15 | E1 | 265 | 92 | Absent | Absent |
| 16 | M1 | P16 | E1 | 265 | 92 | Absent | Absent |
| 17 | M1 | P17 | E1 | 265 | 92 | Absent | Absent |
| 18 | M1 | P18 | E1 | 265 | 92 | Absent | Absent |
| 19 | M1 | P19 | E1 | 265 | 92 | Absent | Absent |
| 20 | M1 | P20 | E1 | 265 | 92 | Absent | Absent |
| 21 | M1 | P21 | E1 | 265 | 92 | Absent | Absent |
| 22 | M1 | P22 | E1 | 265 | 92 | Absent | Absent |
| 23 | M1 | P23 | E1 | 265 | 92 | Absent | Absent |
| 24 | M1 | P24 | E1 | 265 | 97 | Absent | Absent |

| Experiment No. | Heating and fusing conditions Heating temperature of can body and seamed portion (° C.) | Heating and fusing conditions Heat sealing time (sec) | Presence or absence of surface dents of surface of thermoplastic polyester-based resin layer during heating with heating tool | Thermal fusibility evaluation result | Can sealability evaluation result | Classification of invention example and comparative example |
|---|---|---|---|---|---|---|
| 1 | 220 | 0.5 | Good | Acceptable | Good | Comparative Example |
| 2 | 220 | 0.5 | Good | Good | Good | Invention Example |
| 3 | 220 | 0.5 | Good | Good | Good | Invention Example |
| 4 | 220 | 0.5 | Good | Good | Good | Invention Example |
| 5 | 220 | 0.5 | Good | Acceptable | Good | Comparative Example |
| 6 | 220 | 0.5 | Good | Good | Good | Invention Example |
| 7 | 220 | 0.5 | Good | Good | Good | Invention Example |
| 8 | 220 | 0.5 | Good | Good | Good | Invention Example |
| 9 | 220 | 0.5 | Good | Good | Good | Comparative Example |
| 10 | 220 | 0.5 | Good | Good | Good | Invention Example |
| 11 | 220 | 0.5 | Good | Good | Good | Invention Example |
| 12 | 220 | 0.5 | Good | Good | Good | Invention Example |
| 13 | 220 | 0.5 | Good | Good | Good | Comparative Example |
| 14 | 220 | 0.5 | Good | Good | Good | Invention Example |

TABLE 4-1-continued

| | | | | | | |
|---|---|---|---|---|---|---|
| 15 | 220 | 0.5 | Good | Good | Good | Invention Example |
| 16 | 220 | 0.5 | Good | Good | Good | Invention Example |
| 17 | 220 | 0.5 | Good | Acceptable | Unacceptable | Comparative Example |
| 18 | 220 | 0.5 | Good | Acceptable | Unacceptable | Comparative Example |
| 19 | 220 | 0.5 | Good | Good | Unacceptable | Comparative Example |
| 20 | 220 | 0.5 | Good | Good | Unacceptable | Comparative Example |
| 21 | 220 | 0.5 | Good | Acceptable | Unacceptable | Comparative Example |
| 22 | 220 | 0.5 | Good | Acceptable | Unacceptable | Comparative Example |
| 23 | 220 | 0.5 | Good | Good | Unacceptable | Comparative Example |
| 24 | 220 | 0.5 | Good | Good | Unacceptable | Comparative Example |

TABLE 4-2

Configuration of resin laminate steel sheet and film surface external appearance during laminating

| Experiment No. | Steel sheet | Film combination PP-base resin layer | Film combination Thermoplastic polyester-based resin layer | Laminating temperature (° C.) | Difference in melting point between polypropylene-based resin layer and thermoplastic polyester-based resin layer (° C.) | Presence or absence of film defect during laminating — Presence or absence of surface roughness during laminating of PP-based resin layer | Presence or absence of fusion of resin to laminating roll |
|---|---|---|---|---|---|---|---|
| 25 | M1 | P25 | E1 | 265 | 92 | Absent | Absent |
| 26 | M1 | P26 | E1 | 265 | 92 | Absent | Absent |
| 27 | M1 | P27 | E1 | 265 | 92 | Absent | Absent |
| 28 | M1 | P28 | E1 | 265 | 92 | Present | Present |
| 29 | M1 | P29 | E1 | 265 | 92 | Absent | Absent |
| 30 | M1 | P30 | E1 | 265 | 92 | Present | Absent |
| 31 | M1 | P31 | E1 | 265 | 92 | Absent | Absent |
| 32 | M1 | P32 | E1 | 265 | 92 | Absent | Absent |
| 33 | M1 | P33 | E1 | 265 | 92 | Present | Absent |
| 34 | M1 | P34 | E1 | 265 | 90 | Absent | Absent |
| 35 | M1 | P35 | E1 | 265 | 92 | Present | Present |
| 36 | M1 | P36 | E1 | 265 | 92 | Absent | Absent |
| 37 | M1 | P37 | E1 | 265 | 92 | Absent | Absent |
| 38 | M1 | P38 | E1 | 265 | 92 | Absent | Absent |
| 39 | M1 | P39 | E1 | 265 | 92 | Absent | Absent |
| 40 | M1 | P1 | E2 | 265 | 67 | Present | Present |
| 41 | M1 | P2 | E2 | 265 | 67 | Absent | Absent |
| 42 | M1 | P3 | E2 | 265 | 67 | Absent | Absent |
| 43 | M1 | P4 | E2 | 265 | 67 | Absent | Absent |
| 44 | M1 | P5 | E2 | 265 | 67 | Present | Present |
| 45 | M1 | P6 | E2 | 265 | 67 | Absent | Absent |
| 46 | M1 | P7 | E2 | 265 | 67 | Absent | Absent |
| 47 | M1 | P8 | E2 | 265 | 67 | Absent | Absent |
| 48 | M1 | P9 | E2 | 265 | 67 | Present | Present |

| Experiment No. | Heating and fusing conditions — Heating temperature of can body and seamed portion (° C.) | Heating and fusing conditions — Heat sealing time (sec) | Evaluation results — Presence or absence of surface dents of surface of thermoplastic polyester-based resin layer during heating with heating tool | Thermal fusibility evaluation result | Can sealability evaluation result | Classification of invention example and comparative example |
|---|---|---|---|---|---|---|
| 25 | 220 | 0.5 | Good | Good | Good | Invention Example |
| 26 | 220 | 0.5 | Good | Good | Good | Invention Example |
| 27 | 220 | 0.5 | Good | Good | Good | Invention Example |
| 28 | 220 | 0.5 | Good | Good | Good | Comparative Example |
| 29 | 220 | 0.5 | Good | Unacceptable | Acceptable | Comparative Example |
| 30 | 220 | 0.5 | Good | Good | Unacceptable | Comparative Example |
| 31 | 220 | 0.5 | Good | Unacceptable | Good | Comparative Example |
| 32 | 220 | 0.5 | Good | Unacceptable | Acceptable | Comparative Example |
| 33 | 220 | 0.5 | Good | Unacceptable | Acceptable | Comparative Example |
| 34 | 220 | 0.5 | Good | Good | Good | Invention Example |
| 35 | 220 | 0.5 | Good | Good | Good | Comparative Example |

TABLE 4-2-continued

| | | | | | | |
|---|---|---|---|---|---|---|
| 36 | 220 | 1.0 | Good | Good | Good | Invention Example |
| 37 | 220 | 1.0 | Good | Good | Good | Invention Example |
| 38 | 220 | 1.0 | Good | Good | Good | Invention Example |
| 39 | 220 | 1.0 | Good | Good | Good | Invention Example |
| 40 | 200 | 1.0 | Good | Acceptable | Good | Comparative Example |
| 41 | 200 | 1.0 | Good | Good | Good | Invention Example |
| 42 | 200 | 1.0 | Good | Good | Good | Invention Example |
| 43 | 200 | 1.0 | Good | Good | Good | Invention Example |
| 44 | 200 | 1.0 | Good | Acceptable | Good | Comparative Example |
| 45 | 200 | 1.0 | Good | Good | Good | Invention Example |
| 46 | 200 | 1.0 | Good | Good | Good | Invention Example |
| 47 | 200 | 1.0 | Good | Good | Good | Invention Example |
| 48 | 200 | 1.0 | Good | Good | Good | Comparative Example |

TABLE 4-3

Configuration of resin laminate steel sheet and film surface external appearance during laminating

| | | Film combination | | | Difference in melting point between polypropylene-based resin layer and thermoplastic polyester-based resin layer (° C.) | Presence or absence of film defect during laminating | |
|---|---|---|---|---|---|---|---|
| Experiment No. | Steel sheet | PP-base resin layer | Thermoplastic polyester-based resin layer | Laminating temperature (° C.) | | Presence or absence of surface roughness during laminating of PP-based resin layer | Presence or absence of fusion of resin to laminating roll |
| 49 | M1 | P10 | E2 | 265 | 67 | Absent | Absent |
| 50 | M1 | P11 | E2 | 265 | 67 | Absent | Absent |
| 51 | M1 | P12 | E2 | 265 | 67 | Absent | Absent |
| 52 | M1 | P13 | E2 | 265 | 67 | Present | Present |
| 53 | M1 | P14 | E2 | 265 | 67 | Absent | Absent |
| 54 | M1 | P15 | E2 | 265 | 67 | Absent | Absent |
| 55 | M1 | P16 | E2 | 265 | 67 | Absent | Absent |
| 56 | M1 | P17 | E2 | 265 | 67 | Absent | Absent |
| 57 | M1 | P18 | E2 | 265 | 67 | Absent | Absent |
| 58 | M1 | P19 | E2 | 265 | 67 | Absent | Absent |
| 59 | M1 | P20 | E2 | 265 | 67 | Absent | Absent |
| 60 | M1 | P21 | E2 | 265 | 67 | Absent | Absent |
| 61 | M1 | P22 | E2 | 265 | 67 | Absent | Absent |
| 62 | M1 | P23 | E2 | 265 | 67 | Absent | Absent |
| 63 | M1 | P24 | E2 | 265 | 67 | Absent | Absent |
| 64 | M1 | P25 | E2 | 265 | 67 | Absent | Absent |
| 65 | M1 | P26 | E2 | 265 | 67 | Absent | Absent |
| 66 | M1 | P27 | E2 | 265 | 67 | Absent | Absent |
| 67 | M1 | P28 | E2 | 265 | 67 | Present | Present |
| 68 | M1 | P29 | E2 | 265 | 67 | Absent | Absent |
| 69 | M1 | P30 | E2 | 265 | 67 | Present | Absent |
| 70 | M1 | P31 | E2 | 265 | 67 | Absent | Absent |
| 71 | M1 | P32 | E2 | 265 | 67 | Absent | Absent |
| 72 | M1 | P33 | E2 | 265 | 67 | Present | Absent |

| | Heating and fusing conditions | | Evaluation results | | | |
|---|---|---|---|---|---|---|
| Experiment No. | Heating temperature of can body and seamed portion (° C.) | Heat sealing time (sec) | Presence or absence of surface dents of surface of thermoplastic polyester-based resin layer during heating with heating tool | Thermal fusibility evaluation result | Can sealability evaluation result | Classification of invention example and comparative example |
| 49 | 200 | 1.0 | Good | Good | Good | Invention Example |
| 50 | 200 | 1.0 | Good | Good | Good | Invention Example |
| 51 | 200 | 1.0 | Good | Good | Good | Invention Example |
| 52 | 200 | 1.0 | Good | Good | Good | Comparative Example |
| 53 | 200 | 1.0 | Good | Good | Good | Invention Example |
| 54 | 200 | 1.0 | Good | Good | Good | Invention Example |
| 55 | 200 | 1.0 | Good | Good | Good | Invention Example |
| 56 | 200 | 1.0 | Good | Acceptable | Unacceptable | Comparative Example |

TABLE 4-3-continued

| | | | | | | |
|---|---|---|---|---|---|---|
| 57 | 200 | 1.0 | Good | Acceptable | Unacceptable | Comparative Example |
| 58 | 200 | 1.0 | Good | Good | Unacceptable | Comparative Example |
| 59 | 200 | 1.0 | Good | Good | Unacceptable | Comparative Example |
| 60 | 200 | 1.0 | Good | Acceptable | Unacceptable | Comparative Example |
| 61 | 200 | 1.0 | Good | Acceptable | Unacceptable | Comparative Example |
| 62 | 200 | 1.0 | Good | Good | Unacceptable | Comparative Example |
| 63 | 200 | 1.0 | Good | Good | Unacceptable | Comparative Example |
| 64 | 200 | 1.0 | Good | Good | Good | Invention Example |
| 65 | 200 | 1.0 | Good | Good | Good | Invention Example |
| 66 | 200 | 1.0 | Good | Good | Good | Invention Example |
| 67 | 200 | 1.0 | Good | Good | Good | Comparative Example |
| 68 | 200 | 1.0 | Good | Unacceptable | Acceptable | Comparative Example |
| 69 | 200 | 1.0 | Good | Good | Unacceptable | Comparative Example |
| 70 | 200 | 1.0 | Good | Unacceptable | Good | Comparative Example |
| 71 | 200 | 1.0 | Good | Unacceptable | Acceptable | Comparative Example |
| 72 | 200 | 1.0 | Good | Unacceptable | Acceptable | Comparative Example |

TABLE 4-4

Configuration of resin laminate steel sheet and film surface external appearance during laminating

| | | Film combination | | | Difference in melting point between polypropylene-based resin layer and thermoplastic polyester-based resin layer (° C.) | Presence or absence of film defect during laminating | |
|---|---|---|---|---|---|---|---|
| Experiment No. | Steel sheet | PP-base resin layer | Thermoplastic polyester-based resin layer | Laminating temperature (° C.) | | Presence or absence of surface roughness during laminating of PP-based resin layer | Presence or absence of fusion of resin to laminating roll |
| 73 | M1 | P34 | E2 | 265 | 65 | Absent | Absent |
| 74 | M1 | P35 | E2 | 265 | 67 | Present | Present |
| 75 | M1 | P36 | E2 | 265 | 67 | Absent | Absent |
| 76 | M1 | P37 | E2 | 265 | 67 | Absent | Absent |
| 77 | M1 | P38 | E2 | 265 | 67 | Absent | Absent |
| 78 | M1 | P39 | E2 | 265 | 67 | Absent | Absent |
| 79 | M1 | P1 | E2 | 245 | 67 | Present | Present |
| 80 | M1 | P2 | E2 | 245 | 67 | Absent | Absent |
| 81 | M1 | P3 | E2 | 245 | 67 | Absent | Absent |
| 82 | M1 | P4 | E2 | 245 | 67 | Absent | Absent |
| 83 | M1 | P5 | E2 | 245 | 67 | Present | Present |
| 84 | M1 | P6 | E2 | 245 | 67 | Absent | Absent |
| 85 | M1 | P7 | E2 | 245 | 67 | Absent | Absent |
| 86 | M1 | P8 | E2 | 245 | 67 | Absent | Absent |
| 87 | M1 | P9 | E2 | 245 | 67 | Present | Present |
| 88 | M1 | P10 | E2 | 245 | 67 | Absent | Absent |
| 89 | M1 | P11 | E2 | 245 | 67 | Absent | Absent |
| 90 | M1 | P12 | E2 | 245 | 67 | Absent | Absent |
| 91 | M1 | P13 | E2 | 245 | 67 | Present | Present |
| 92 | M1 | P14 | E2 | 245 | 67 | Absent | Absent |
| 93 | M1 | P15 | E2 | 245 | 67 | Absent | Absent |
| 94 | M1 | P16 | E2 | 245 | 67 | Absent | Absent |
| 95 | M1 | P17 | E2 | 245 | 67 | Absent | Absent |
| 96 | M1 | P18 | E2 | 245 | 67 | Absent | Absent |

| | Heating and fusing conditions | | Evaluation results | | | |
|---|---|---|---|---|---|---|
| Experiment No. | Heating temperature of can body and seamed portion (° C.) | Heat sealing time (sec) | Presence or absence of surface dents of surface of thermoplastic polyester-based resin layer during heating with heating tool | Thermal fusibility evaluation result | Can sealability evaluation result | Classification of invention example and comparative example |
| 73 | 200 | 1.0 | Good | Good | Good | Invention Example |
| 74 | 200 | 1.0 | Good | Good | Good | Comparative Example |
| 75 | 220 | 1.0 | Good | Good | Good | Invention Example |
| 76 | 220 | 1.0 | Good | Good | Good | Invention Example |
| 77 | 220 | 1.0 | Good | Good | Good | Invention Example |

TABLE 4-4-continued

| | | | | | | |
|---|---|---|---|---|---|---|
| 78 | 220 | 1.0 | Good | Good | Good | Invention Example |
| 79 | 200 | 1.0 | Good | Acceptable | Good | Comparative Example |
| 80 | 200 | 1.0 | Good | Good | Good | Invention Example |
| 81 | 200 | 1.0 | Good | Good | Good | Invention Example |
| 82 | 200 | 1.0 | Good | Good | Good | Invention Example |
| 83 | 200 | 1.0 | Good | Acceptable | Good | Comparative Example |
| 84 | 200 | 1.0 | Good | Good | Good | Invention Example |
| 85 | 200 | 1.0 | Good | Good | Good | Invention Example |
| 86 | 200 | 1.0 | Good | Good | Good | Invention Example |
| 87 | 200 | 1.0 | Good | Good | Good | Comparative Example |
| 88 | 200 | 1.0 | Good | Good | Good | Invention Example |
| 89 | 200 | 1.0 | Good | Good | Good | Invention Example |
| 90 | 200 | 1.0 | Good | Good | Good | Invention Example |
| 91 | 200 | 1.0 | Good | Good | Good | Comparative Example |
| 92 | 200 | 1.0 | Good | Good | Good | Invention Example |
| 93 | 200 | 1.0 | Good | Good | Good | Invention Example |
| 94 | 200 | 1.0 | Good | Good | Good | Invention Example |
| 95 | 200 | 1.0 | Good | Acceptable | Unacceptable | Comparative Example |
| 96 | 200 | 1.0 | Good | Acceptable | Unacceptable | Comparative Example |

TABLE 4-5

Configuration of resin laminate steel sheet and film surface external appearance during laminating

| | | Film combination | | | Difference in melting point between polypropylene-based resin layer and thermoplastic polyester-based resin layer (° C.) | Presence or absence of film defect during laminating | |
|---|---|---|---|---|---|---|---|
| Experiment No. | Steel sheet | PP-base resin layer | Thermoplastic polyester-based resin layer | Laminating temperature (° C.) | | Presence or absence of surface roughness during laminating of PP-based resin layer | Presence or absence of fusion of resin to laminating roll |
| 97 | M1 | P19 | E2 | 245 | 67 | Absent | Absent |
| 98 | M1 | P20 | E2 | 245 | 67 | Absent | Absent |
| 99 | M1 | P21 | E2 | 245 | 67 | Absent | Absent |
| 100 | M1 | P22 | E2 | 245 | 67 | Absent | Absent |
| 101 | M1 | P23 | E2 | 245 | 67 | Absent | Absent |
| 102 | M1 | P24 | E2 | 245 | 67 | Absent | Absent |
| 103 | M1 | P25 | E2 | 245 | 67 | Absent | Absent |
| 104 | M1 | P26 | E2 | 245 | 67 | Absent | Absent |
| 105 | M1 | P27 | E2 | 245 | 67 | Absent | Absent |
| 106 | M1 | P28 | E2 | 245 | 67 | Present | Present |
| 107 | M1 | P29 | E2 | 245 | 67 | Absent | Absent |
| 108 | M1 | P30 | E2 | 245 | 67 | Present | Absent |
| 109 | M1 | P31 | E2 | 245 | 67 | Absent | Absent |
| 110 | M1 | P32 | E2 | 245 | 67 | Absent | Absent |
| 111 | M1 | P33 | E2 | 245 | 67 | Present | Absent |
| 112 | M1 | P34 | E2 | 245 | 67 | Absent | Absent |
| 113 | M1 | P35 | E2 | 245 | 67 | Present | Present |
| 114 | M1 | P36 | E2 | 265 | 67 | Absent | Absent |
| 115 | M1 | P37 | E2 | 265 | 67 | Absent | Absent |
| 116 | M1 | P38 | E2 | 265 | 67 | Absent | Absent |
| 117 | M1 | P39 | E2 | 265 | 67 | Absent | Absent |
| 118 | M1 | P1 | E3 | 230 | 53 | Present | Present |
| 119 | M1 | P2 | E3 | 230 | 53 | Absent | Absent |
| 120 | M1 | P3 | E3 | 230 | 53 | Absent | Absent |

| | Heating and fusing conditions | | Evaluation results | | | |
|---|---|---|---|---|---|---|
| Experiment No. | Heating temperature of can body and seamed portion (° C.) | Heat sealing time (sec) | Presence or absence of surface dents of surface of thermoplastic polyester-based resin layer during heating with heating tool | Thermal fusibility evaluation result | Can sealability evaluation result | Classification of invention example and comparative example |
| 97 | 200 | 1.0 | Good | Good | Unacceptable | Comparative Example |
| 98 | 200 | 1.0 | Good | Good | Unacceptable | Comparative Example |

TABLE 4-5-continued

| | | | | | | | |
|---|---|---|---|---|---|---|---|
| 99 | 200 | 1.0 | Good | Acceptable | Unacceptable | Comparative Example |
| 100 | 200 | 1.0 | Good | Acceptable | Unacceptable | Comparative Example |
| 101 | 200 | 1.0 | Good | Good | Unacceptable | Comparative Example |
| 102 | 200 | 1.0 | Good | Good | Unacceptable | Comparative Example |
| 103 | 200 | 1.0 | Good | Good | Good | Invention Example |
| 104 | 200 | 1.0 | Good | Good | Good | Invention Example |
| 105 | 200 | 1.0 | Good | Good | Good | Invention Example |
| 106 | 200 | 1.0 | Good | Good | Good | Comparative Example |
| 107 | 200 | 1.0 | Good | Unacceptable | Acceptable | Comparative Example |
| 108 | 200 | 1.0 | Good | Good | Unacceptable | Comparative Example |
| 109 | 200 | 1.0 | Good | Unacceptable | Good | Comparative Example |
| 110 | 200 | 1.0 | Good | Unacceptable | Acceptable | Comparative Example |
| 111 | 200 | 1.0 | Good | Unacceptable | Acceptable | Comparative Example |
| 112 | 200 | 1.0 | Good | Good | Good | Invention Example |
| 113 | 200 | 1.0 | Good | Good | Good | Comparative Example |
| 114 | 200 | 1.0 | Good | Good | Good | Invention Example |
| 115 | 200 | 1.0 | Good | Good | Good | Invention Example |
| 116 | 200 | 1.0 | Good | Good | Good | Invention Example |
| 117 | 200 | 1.0 | Good | Good | Good | Invention Example |
| 118 | 200 | 1.0 | Good | Acceptable | Good | Comparative Example |
| 119 | 200 | 1.0 | Good | Good | Good | Invention Example |
| 120 | 200 | 1.0 | Good | Good | Good | Invention Example |

TABLE 4-6

Configuration of resin laminate steel sheet and film surface external appearance during laminating

| | | Film combination | | | | Presence or absence of film defect during laminating | |
|---|---|---|---|---|---|---|---|
| Experiment No. | Steel sheet | PP-base resin layer | Thermoplastic polyester-based resin layer | Laminating temperature (° C.) | Difference in melting point between polypropylene-based resin layer and thermoplastic polyester-based resin layer (° C.) | Presence or absence of surface roughness during laminating of PP-based resin layer | Presence or absence of fusion of resin to laminating roll |
| 121 | M1 | P4 | E3 | 230 | 53 | Absent | Absent |
| 122 | M1 | P5 | E3 | 230 | 53 | Present | Present |
| 123 | M1 | P6 | E3 | 230 | 53 | Absent | Absent |
| 124 | M1 | P7 | E3 | 230 | 53 | Absent | Absent |
| 125 | M1 | P8 | E3 | 230 | 53 | Absent | Absent |
| 126 | M1 | P9 | E3 | 230 | 53 | Present | Present |
| 127 | M1 | P10 | E3 | 230 | 53 | Absent | Absent |
| 128 | M1 | P11 | E3 | 230 | 53 | Absent | Absent |
| 129 | M1 | P12 | E3 | 230 | 53 | Absent | Absent |
| 130 | M1 | P13 | E3 | 230 | 53 | Present | Present |
| 131 | M1 | P14 | E3 | 230 | 53 | Absent | Absent |
| 132 | M1 | P15 | E3 | 230 | 53 | Absent | Absent |
| 133 | M1 | P16 | E3 | 230 | 53 | Absent | Absent |
| 134 | M1 | P17 | E3 | 230 | 53 | Absent | Absent |
| 135 | M1 | P18 | E3 | 230 | 53 | Absent | Absent |
| 136 | M1 | P19 | E3 | 230 | 53 | Absent | Absent |
| 137 | M1 | P20 | E3 | 230 | 53 | Absent | Absent |
| 138 | M1 | P21 | E3 | 230 | 53 | Absent | Absent |
| 139 | M1 | P22 | E3 | 230 | 53 | Absent | Absent |
| 140 | M1 | P23 | E3 | 230 | 53 | Absent | Absent |
| 141 | M1 | P24 | E3 | 230 | 53 | Absent | Absent |
| 142 | M1 | P25 | E3 | 230 | 53 | Absent | Absent |
| 143 | M1 | P26 | E3 | 230 | 53 | Absent | Absent |
| 144 | M1 | P27 | E3 | 230 | 53 | Absent | Absent |

TABLE 4-6-continued

| | Heating and fusing conditions | | Evaluation results | | | |
|---|---|---|---|---|---|---|
| Experiment No. | Heating temperature of can body and seamed portion (° C.) | Heat sealing time (sec) | Presence or absence of surface dents of surface of thermoplastic polyester-based resin layer during heating with heating tool | Thermal fusibility evaluation result | Can sealability evaluation result | Classification of invention example and comparative example |
| 121 | 200 | 1.0 | Good | Good | Good | Invention Example |
| 122 | 200 | 1.0 | Good | Acceptable | Good | Comparative Example |
| 123 | 200 | 1.0 | Good | Good | Good | Invention Example |
| 124 | 200 | 1.0 | Good | Good | Good | Invention Example |
| 125 | 200 | 1.0 | Good | Good | Good | Invention Example |
| 126 | 200 | 1.0 | Good | Good | Good | Comparative Example |
| 127 | 200 | 1.0 | Good | Good | Good | Invention Example |
| 128 | 200 | 1.0 | Good | Good | Good | Invention Example |
| 129 | 200 | 1.0 | Good | Good | Good | Invention Example |
| 130 | 200 | 1.0 | Good | Good | Good | Comparative Example |
| 131 | 200 | 1.0 | Good | Good | Good | Invention Example |
| 132 | 200 | 1.0 | Good | Good | Good | Invention Example |
| 133 | 200 | 1.0 | Good | Good | Good | Invention Example |
| 134 | 200 | 1.0 | Good | Acceptable | Unacceptable | Comparative Example |
| 135 | 200 | 1.0 | Good | Acceptable | Unacceptable | Comparative Example |
| 136 | 200 | 1.0 | Good | Good | Unacceptable | Comparative Example |
| 137 | 200 | 1.0 | Good | Good | Unacceptable | Comparative Example |
| 138 | 200 | 1.0 | Good | Acceptable | Unacceptable | Comparative Example |
| 139 | 200 | 1.0 | Good | Acceptable | Unacceptable | Comparative Example |
| 140 | 200 | 1.0 | Good | Good | Unacceptable | Comparative Example |
| 141 | 200 | 1.0 | Good | Good | Unacceptable | Comparative Example |
| 142 | 200 | 1.0 | Good | Good | Good | Invention Example |
| 143 | 200 | 1.0 | Good | Good | Good | Invention Example |
| 144 | 200 | 1.0 | Good | Good | Good | Invention Example |

TABLE 4-7

Configuration of resin laminate steel sheet and film surface external appearance during laminating

| | | Film combination | | | | Presence or absence of film defect during laminating | |
|---|---|---|---|---|---|---|---|
| Experiment No. | Steel sheet | PP-base resin layer | Thermoplastic polyester-based resin layer | Laminating temperature (° C.) | Difference in melting point between polypropylene-based resin layer and thermoplastic polyester-based resin layer (° C.) | Presence or absence of surface roughness during laminating of PP-based resin layer | Presence or absence of fusion of resin to laminating roll |
| 145 | M1 | P28 | E3 | 230 | 53 | Present | Present |
| 146 | M1 | P29 | E3 | 230 | 53 | Absent | Absent |
| 147 | M1 | P30 | E3 | 230 | 53 | Present | Absent |
| 148 | M1 | P31 | E3 | 230 | 53 | Absent | Absent |
| 149 | M1 | P32 | E3 | 230 | 53 | Absent | Absent |
| 150 | M1 | P33 | E3 | 230 | 53 | Present | Absent |
| 151 | M1 | P34 | E3 | 230 | 51 | Absent | Absent |
| 152 | M1 | P35 | E3 | 230 | 53 | Present | Present |
| 153 | M1 | P36 | E3 | 230 | 53 | Absent | Absent |
| 154 | M1 | P37 | E3 | 230 | 53 | Absent | Absent |
| 155 | M1 | P38 | E3 | 230 | 53 | Absent | Absent |
| 156 | M1 | P39 | E3 | 230 | 53 | Absent | Absent |
| 157 | M1 | P1 | E4 | 215 | 43 | Present | Present |
| 158 | M1 | P12 | E3 | 230 | 53 | Absent | Absent |
| 159 | M1 | P3 | E4 | 215 | 43 | Absent | Absent |
| 160 | M1 | P4 | E4 | 215 | 43 | Absent | Absent |
| 161 | M1 | P5 | E4 | 215 | 43 | Present | Present |
| 162 | M1 | P6 | E4 | 215 | 43 | Absent | Absent |
| 163 | M1 | P7 | E4 | 215 | 43 | Absent | Absent |
| 164 | M1 | P8 | E4 | 215 | 43 | Absent | Absent |
| 165 | M1 | P9 | E4 | 215 | 43 | Present | Present |
| 166 | M1 | P10 | E4 | 215 | 43 | Absent | Absent |

TABLE 4-7-continued

| | | | | | | |
|---|---|---|---|---|---|---|
| 167 | M1 | P11 | E4 | 215 | 43 | Absent Absent |
| 168 | M1 | P12 | E4 | 215 | 43 | Absent Absent |

| | Heating and fusing conditions | | Evaluation results | | | |
|---|---|---|---|---|---|---|
| Experiment No. | Heating temperature of can body and seamed portion (° C.) | Heat sealing time (sec) | Presence or absence of surface dents of surface of thermoplastic polyester-based resin layer during heating with heating tool | Thermal fusibility evaluation result | Can sealability evaluation result | Classification of invention example and comparative example |
| 145 | 200 | 1.0 | Good | Good | Good | Comparative Example |
| 146 | 200 | 1.0 | Good | Unacceptable | Acceptable | Comparative Example |
| 147 | 200 | 1.0 | Good | Good | Unacceptable | Comparative Example |
| 148 | 200 | 1.0 | Good | Unacceptable | Good | Comparative Example |
| 149 | 200 | 1.0 | Good | Unacceptable | Acceptable | Comparative Example |
| 150 | 200 | 1.0 | Good | Unacceptable | Acceptable | Comparative Example |
| 151 | 200 | 1.0 | Good | Good | Good | Invention Example |
| 152 | 200 | 1.0 | Good | Good | Good | Comparative Example |
| 153 | 200 | 1.0 | Good | Good | Good | Invention Example |
| 154 | 200 | 1.0 | Good | Good | Good | Invention Example |
| 155 | 200 | 1.0 | Good | Good | Good | Invention Example |
| 156 | 200 | 1.0 | Good | Good | Good | Invention Example |
| 157 | 190 | 1.0 | Acceptable | Acceptable | Good | Comparative Example |
| 158 | 200 | 1.0 | Good | Good | Good | Invention Example |
| 159 | 190 | 1.0 | Acceptable | Good | Good | Invention Example |
| 160 | 190 | 1.0 | Acceptable | Good | Good | Invention Example |
| 161 | 190 | 1.0 | Acceptable | Acceptable | Good | Comparative Example |
| 162 | 190 | 1.0 | Acceptable | Good | Good | Invention Example |
| 163 | 190 | 1.0 | Acceptable | Good | Good | Invention Example |
| 164 | 190 | 1.0 | Acceptable | Good | Good | Invention Example |
| 165 | 190 | 1.0 | Acceptable | Good | Good | Comparative Example |
| 166 | 190 | 1.0 | Acceptable | Good | Good | Invention Example |
| 167 | 190 | 1.0 | Acceptable | Good | Good | Invention Example |
| 168 | 190 | 1.0 | Acceptable | Good | Good | Invention Example |

TABLE 4-8

Configuration of resin laminate steel sheet and film surface external appearance during laminating

| | | Film combination | | | | Presence or absence of film defect during laminating | |
|---|---|---|---|---|---|---|---|
| Experiment No. | Steel sheet | PP-base resin layer | Thermoplastic polyester-based resin layer | Laminating temperature (° C.) | Difference in melting point between polypropylene-based resin layer and thermoplastic polyester-based resin layer (° C.) | Presence or absence of surface roughness during laminating of PP-based resin layer | Presence or absence of fusion of resin to laminating roll |
| 169 | M1 | P13 | E4 | 215 | 43 | Present | Present |
| 170 | M1 | P14 | E4 | 215 | 43 | Absent | Absent |
| 171 | M1 | P15 | E4 | 215 | 43 | Absent | Absent |
| 172 | M1 | P16 | E4 | 215 | 43 | Absent | Absent |
| 173 | M1 | P17 | E4 | 215 | 43 | Absent | Absent |
| 174 | M1 | P18 | E4 | 215 | 43 | Absent | Absent |
| 175 | M1 | P19 | E4 | 215 | 43 | Absent | Absent |
| 176 | M1 | P20 | E4 | 215 | 43 | Absent | Absent |
| 177 | M1 | P21 | E4 | 215 | 43 | Absent | Absent |
| 178 | M1 | P22 | E4 | 215 | 43 | Absent | Absent |
| 179 | M1 | P23 | E4 | 215 | 43 | Absent | Absent |
| 180 | M1 | P24 | E4 | 215 | 43 | Absent | Absent |
| 181 | M1 | P25 | E4 | 215 | 43 | Absent | Absent |
| 182 | M1 | P26 | E4 | 215 | 43 | Absent | Absent |
| 183 | M1 | P27 | E4 | 215 | 43 | Absent | Absent |
| 184 | M1 | P28 | E4 | 215 | 43 | Present | Present |
| 185 | M1 | P29 | E4 | 215 | 43 | Absent | Absent |
| 186 | M1 | P30 | E4 | 215 | 43 | Present | Absent |
| 187 | M1 | P31 | E4 | 215 | 43 | Absent | Absent |

TABLE 4-8-continued

| | | | | | | | |
|---|---|---|---|---|---|---|---|
| 188 | M1 | P32 | E4 | 215 | 43 | Absent | Absent |
| 189 | M1 | P33 | E4 | 215 | 43 | Present | Absent |
| 190 | M1 | P34 | E4 | 215 | 41 | Absent | Absent |
| 191 | M1 | P35 | E4 | 215 | 43 | Present | Present |
| 192 | M1 | P36 | E4 | 230 | 43 | Absent | Absent |

| | Heating and fusing conditions | | Evaluation results | | | |
|---|---|---|---|---|---|---|
| Experiment No. | Heating temperature of can body and seamed portion (° C.) | Heat sealing time (sec) | Presence or absence of surface dents of surface of thermoplastic polyester-based resin layer during heating with heating tool | Thermal fusibility evaluation result | Can sealability evaluation result | Classification of invention example and comparative example |
| 169 | 190 | 1.0 | Acceptable | Good | Good | Comparative Example |
| 170 | 190 | 1.0 | Acceptable | Good | Good | Invention Example |
| 171 | 190 | 1.0 | Acceptable | Good | Good | Invention Example |
| 172 | 190 | 1.0 | Acceptable | Good | Good | Invention Example |
| 173 | 190 | 1.0 | Acceptable | Acceptable | Unacceptable | Comparative Example |
| 174 | 190 | 1.0 | Acceptable | Acceptable | Unacceptable | Comparative Example |
| 175 | 190 | 1.0 | Acceptable | Good | Unacceptable | Comparative Example |
| 176 | 190 | 1.0 | Acceptable | Good | Unacceptable | Comparative Example |
| 177 | 190 | 1.0 | Acceptable | Acceptable | Unacceptable | Comparative Example |
| 178 | 190 | 1.0 | Acceptable | Acceptable | Unacceptable | Comparative Example |
| 179 | 190 | 1.0 | Acceptable | Good | Unacceptable | Comparative Example |
| 180 | 190 | 1.0 | Acceptable | Good | Unacceptable | Comparative Example |
| 181 | 190 | 1.0 | Acceptable | Good | Good | Invention Example |
| 182 | 190 | 1.0 | Acceptable | Good | Good | Invention Example |
| 183 | 190 | 1.0 | Acceptable | Good | Good | Invention Example |
| 184 | 190 | 1.0 | Acceptable | Good | Good | Comparative Example |
| 185 | 190 | 1.0 | Acceptable | Unacceptable | Acceptable | Comparative Example |
| 186 | 190 | 1.0 | Acceptable | Good | Unacceptable | Comparative Example |
| 187 | 190 | 1.0 | Acceptable | Unacceptable | Good | Comparative Example |
| 188 | 190 | 1.0 | Acceptable | Unacceptable | Acceptable | Comparative Example |
| 189 | 190 | 1.0 | Acceptable | Unacceptable | Acceptable | Comparative Example |
| 190 | 190 | 1.0 | Good | Good | Good | Invention Example |
| 191 | 190 | 1.0 | Acceptable | Good | Good | Comparative Example |
| 192 | 200 | 1.0 | Good | Good | Good | Invention Example |

TABLE 4-9

Configuration of resin laminate steel sheet and film surface external appearance during laminating

| | | Film combination | | | Difference in melting point between polypropylene-based resin layer and thermoplastic polyester-based resin layer (° C.) | Presence or absence of film defect during laminating | |
|---|---|---|---|---|---|---|---|
| Experiment No. | Steel sheet | PP-base resin layer | Thermoplastic polyester-based resin layer | Laminating temperature (° C.) | | Presence or absence of surface roughness during laminating of PP-based resin layer | Presence or absence of fusion of resin to laminating roll |
| 193 | M1 | P37 | E4 | 230 | 43 | Absent | Absent |
| 194 | M1 | P38 | E4 | 230 | 43 | Absent | Absent |
| 195 | M1 | P39 | E4 | 230 | 43 | Absent | Absent |
| 196 | M2 | P7 | E1 | 265 | 92 | Absent | Absent |
| 197 | M2 | P7 | E2 | 245 | 67 | Absent | Absent |
| 198 | M2 | P7 | E3 | 230 | 53 | Absent | Absent |
| 199 | M3 | P7 | E1 | 265 | 92 | Absent | Absent |
| 200 | M3 | P7 | E2 | 245 | 67 | Absent | Absent |
| 201 | M3 | P7 | E3 | 230 | 53 | Absent | Absent |
| 202 | M4 | P7 | E1 | 265 | 92 | Absent | Absent |
| 203 | M4 | P7 | E2 | 245 | 67 | Absent | Absent |
| 204 | M4 | P7 | E3 | 230 | 53 | Absent | Absent |

TABLE 4-9-continued

| | Heating and fusing conditions | | Evaluation results | | | |
|---|---|---|---|---|---|---|
| | | | Presence or absence of surface dents of | | | |
| Experiment No. | Heating temperature of can body and seamed portion (° C.) | Heat sealing time (sec) | surface of thermoplastic polyester-based resin layer during heating with heating tool | Thermal fusibility evaluation result | Can sealability evaluation result | Classification of invention example and comparative example |
| 193 | 200 | 1.0 | Good | Good | Good | Invention Example |
| 194 | 200 | 1.0 | Good | Good | Good | Invention Example |
| 195 | 200 | 1.0 | Good | Good | Good | Invention Example |
| 196 | 200 | 1.0 | Good | Good | Good | Invention Example |
| 197 | 200 | 1.0 | Good | Good | Good | Invention Example |
| 198 | 200 | 1.0 | Good | Good | Good | Invention Example |
| 199 | 200 | 1.0 | Good | Good | Good | Invention Example |
| 200 | 200 | 1.0 | Good | Acceptable | Good | Invention Example |
| 201 | 200 | 1.0 | Good | Good | Good | Invention Example |
| 202 | 200 | 1.0 | Good | Good | Good | Invention Example |
| 203 | 200 | 1.0 | Good | Good | Good | Invention Example |
| 204 | 200 | 1.0 | Good | Good | Good | Invention Example |

Specific descriptions will be provided as follows.

Constituent materials of the resin laminate steel sheet, which are the materials of the can lid and the can bottom made of a resin laminate steel sheet for a resin-metal composite container, are shown below.

1. Steel Sheet

Steel sheets M1 to M4 shown in Table 1 were used. In a case where the steel sheet is a plated steel plate or a chemical conversion steel sheet, the contents are also shown below.

M1 to M4 are steel sheets obtained by subjecting a steel sheet having a thickness of 0.20 mm and a surface roughness of Ra=0.3 μm to a cathode electrolytic treatment in a 5% aqueous sodium hydroxide solution for alkaline degreasing. M1 is a tinfree steel sheet having a metal chromium layer (80 mg/m$^2$) and a chromium hydrated oxide layer (10 mg/m$^2$) on the steel sheet surface. M2 is a reflowed tin-plated steel sheet, and is a so-called tin steel sheet having a Sn—Fe alloy layer (1.3 g/m$^2$), a metal Sn layer (1.5 g/m$^2$), and a chromium hydrated oxide layer (8 mg/m$^2$) from the steel sheet side.

M3 is a reflowed tin-plated steel sheet, and is a chromate-free Sn-plated steel sheet having a Sn—Fe alloy layer (1.3 g/m$^2$), a metal Sn layer (1.5 g/m$^2$), and a chromate-free type chemical conversion film primarily containing ZrO$_2$ (Zr content 5 mg/m$^2$) from the steel sheet side. M4 is a reflowed tin-plated steel sheet, and is a chromate-free Sn-plated steel sheet having a Sn—Fe alloy layer (1.3 g/m$^2$), a metal Sn layer (1.5 g/m$^2$), and a chromate-free type chemical conversion film primarily containing TiO$_2$ (Ti content 5 mg/m$^2$) from the steel sheet side.

2. Resin Film

As the resins of the ethylene-propylene copolymer resin layer, the polypropylene-based resin layer, and the modified polypropylene-based resin layer of the PP-based resin layer used in the resin laminate steel sheet, which is the material of the can lid and the can bottom made of a resin laminate steel sheet for a resin-metal composite container, P1 to P39 shown in Tables 2-1 and 2-2 were used, and as the resin of the thermoplastic polyester-based resin layer on the opposite surface, thermoplastic polyester-based resin films of E1 to E4 shown in Table 3 were used. The PE-PP copolymer resin shown in Tables 2-1 and 2-2 is an ethylene-propylene copolymer (random copolymer), and the PE-PP block copolymer resin is an ethylene-propylene copolymer (block copolymer), the PE blend PP resin is a resin obtained by including polyethylene in polypropylene, the PE resin is polyethylene, the maleic anhydride-modified PP resin is maleic anhydride-modified polypropylene, and the PP resin is homopolypropylene.

The films P1 to P39 of the PP-based resin layer of the resin laminate steel sheet include an ethylene-propylene copolymer resin layer, a polypropylene-based resin layer, and a modified polypropylene-based resin layer in order from the surface layer, and are resin films having various average thicknesses in which the average thickness of the ethylene-propylene copolymer resin layer, the average thickness of the modified polypropylene-based resin layer, and the proportion of ethylene in the ethylene-propylene copolymer resin layer are changed.

As the resin of the thermoplastic polyester-based resin layer 6, a biaxially stretched film of polyethylene terephthalate (PET) having a melting point of 252° C. as shown in E1 of Table 3, a biaxially stretched film (IA-PET) of a copolymer of ethylene terephthalate and ethylene isophthalate (ethylene isophthalate: 12 mol %) having a melting point of 227° C. as shown in E2, a biaxially stretched film (PET-PBT) of a copolymer of stretched polyethylene terephthalate and polybutylene terephthalate having a melting point of 213° C. as shown in E3, and an unstretched PET-based film (a blend film of a copolymer (PETG) of polyethylene terephthalate and cyclohexanedimethanol and a copolymer of ethylene terephthalate and ethylene isophthalate (ethylene isophthalate: 12 mol %)) having a melting point of 203° C. as shown in E4, were used.

As the melting point of the resin film, the temperature of the main endothermic peak when the resin of each layer was collected by melting and extruding the resin of each layer from a T-die of a resin film forming machine and was thermally analyzed by a differential scanning-type calorimeter was used. The DSC apparatus used for the melting point measurement is DSC7030 manufactured by Hitachi High-Tech Science Corporation, and measurement was performed by enclosing 5 to 8 mg of the resin in an aluminum pan and raising the temperature in a nitrogen atmosphere at a temperature rising rate of 10° C./min. The melting points of the ethylene-propylene copolymer resin layer, the polypropylene-based resin layer, and the modified polypropylene-based resin layer are shown in Tables 2-1 and 2-2. The melting point of the thermoplastic polyester-based resin layer is shown in Table 3. The difference in melting point between the polypropylene-based resin layer and the thermoplastic polyester-based resin layer is shown in Tables 4-1, 4-2, 4-3, 4-4, 4-5, 4-6, 4-7, 4-8, and 4-9.

3. Film Laminating Method

A method of laminating the film was implemented by the dedicated film laminating apparatus illustrated in FIG. 18. The film laminating apparatus includes a hot press for heating a steel sheet, a film feeding device for front and rear surfaces, a laminating roll (capable of controlling the surface temperature of the rubber roll with a heating metal backup roll) made of Teflon (registered trademark) rubber, and a cooling water tank, and has a structure in which after a steel sheet is heated to a predetermined temperature, the steel sheet is fed to the film laminating roll, a film is simultaneously fed and pressure-bonded by the roll, and the resultant is cooled with water after about one second. The surface temperature of the steel sheet during laminating (laminating temperature) is as shown in Tables 4-1, 4-2, 4-3, 4-4, 4-5, 4-6, 4-7, 4-8, and 4-9. In addition, the pressing load of the laminating roll was set so that the roll contact pressure was 10 kPa.

The resin laminate steel sheet for testing was produced by laminating a film having a width of 240 mm on a steel sheet coil having a sheet width of 300 mm using the dedicated film laminating apparatus provided with the steel sheet heating roll, the film feeding device for front and rear surfaces, the laminating roll (capable of controlling the surface temperature of the rubber roll with a metal heating backup roll) made of heat-resistant rubber, and the cooling water tank, as illustrated in FIG. 18.

Tables 4-1, 4-2, 4-3, 4-4, 4-5, 4-6, 4-7, 4-8, and 4-9 show the configuration of the resin laminate steel sheet produced by the above manufacturing method, the laminating temperature, and the results of visual determination of presence or absence of the film surface roughness and the presence or absence of fusion to the heating roll of the PP-based resin film (the ethylene-propylene copolymer resin layer, the polypropylene-based resin layer, and the modified polypropylene-based resin layer) during the manufacturing of the resin laminate steel sheet. A case where there was no fusion of the PP-based resin film to the heating roll and there was no damage was determined to be good, a case where there was no fusion of the PP-based resin to the laminating roll and there was irregularities on the film surface was evaluated as acceptable, and a case where there was fusion of the PP-based resin to the laminating roll was evaluated as unacceptable.

4. Method of Heating and Fusing Seamed Portions of Can Lid and Can Bottom

Using the resin laminate steel sheet produced above, a can bottom and a can lid were produced by a usual method. The can bottom made of the resin laminate steel sheet was seamed onto a cylindrical can body made of a PP resin in a direction in which the can inner surface was the PP-based resin film and the outer surface side was the PET-based resin, and thereafter the seamed portion was heated by the IH heating device under the conditions shown in Tables 4-1, 4-2, 4-3, 4-4, 4-5, 4-6, 4-7, 4-8, and 4-9 to thermally fusion-bond the PP-based resin on the inner surface side of the can bottom and the PP resin of the can body together.

5. Evaluation of Can Sealability

After filling the can to which the can bottom was attached with tap water up to 80% of the internal volume of the can and then seaming the can lid manufactured as described above, the seamed portion of the can lid was heated by the IH heating device, thereby producing a can sample. The can weight of the water-packed test can thus produced was measured with an electronic balance to the number of grams with three decimal places, and the can was subjected to a retort treatment in a retort oven at 125° C. for 30 minutes.

The weight of the can subjected to the retort treatment was measured again with the electronic balance to the number of grams with three decimal places. In a case where the weight was reduced by 0.20 mass % or more, it was considered that liquid leakage had occurred and the case was regarded as being unacceptable. In a case where the weight reduction ratio was 0.05 mass % or more and less than 0.20 mass %, the weight loss was not so high that liquid leakage was determined and was determined to be acceptable. In a case where the weight reduction ratio was less than 0.05 mass %, the weight reduction ratio was within a measurement error range, so that the sealability of the can was determined to be good. The results are shown in Tables 4-1, 4-2, 4-3, 4-4, 4-5, 4-6, 4-7, 4-8, and 4-9.

6. Determination of Fusibility

A polypropylene resin sheet (E111G manufactured by Prime Polymer Co., Ltd., 2 mm thick) for the can body cut into a size of 50 mm×100 mm and the resin laminate steel sheet cut into the same size were aligned on the PP-based resin layer side of the resin laminate steel sheet and heated and pressure-bonded (10 N/cm$^2$) for 10 seconds by a hot press heated to 200° C. to heat the steel sheet such that the polypropylene resin sheet and the resin laminate steel sheet were fused. The produced sample was immersed in tap water and subjected to a retort treatment at 125° C. for 30 minutes. Thereafter, the sample after the retort treatment was cut into a width of 10 mm, and the T-type peeling strength was measured as a peeling strength (tension rate=200 mm/min, measurement temperature=24° C.). A case where the peeling strength was 10 N/10 mm or more was determined to be (good), a case where the peeling strength was 5 N/10 mm or more and less than 10 N/10 mm was determined to be (acceptable), and a case where the peeling strength was less than 5 N/10 mm was determined to be (unacceptable). The results are shown in Tables 4-1, 4-2, 4-3, 4-4, 4-5, 4-6, 4-7, 4-8, and 4-9.

In addition, in the case of a method of pressure-bonding a heating jig to the seamed portion as the method of heating and fusing the seamed portions of the can lid and the can bottom, surface dents of the heating tool may remain on the surface of the thermoplastic polyester-based resin layer. Therefore, the presence or absence of surface dents on the surface of the thermoplastic polyester-based resin layer 6 when the seamed portion of the can lid was heated at 200° C. for five seconds by the heating jig was checked. The results are also shown in Tables 4-1, 4-2, 4-3, 4-4, 4-5, 4-6, 4-7, 4-8, and 4-9. Whether or not the surface dents were good or not was visually determined. A case where a change in external appearance was not visually observed was determined to be good, a case where the outline of slight surface dents could be visually seen but there was no sense that the dents were caught even when the dents were traced with a nail was determined to be acceptable, and a case where the outline of dents was clear and the dents were caught on a nail was determined to be unacceptable.

As is clear from the examples and comparative examples, the can lid and the can bottom made of a resin laminate steel sheet for a resin-metal composite container of the present invention have excellent can sealability and fusibility of the resin laminate steel sheet to the PP resin of the can, do not cause fusion of the PP-based resin layer to the laminating roll when the resin laminate steel sheet is manufactured, and thus provide stable manufacturability and excellent economic efficiency.

INDUSTRIAL APPLICABILITY

The can lid and the can bottom made of a resin laminate steel sheet for a resin-metal composite container of the present invention obtain high seaming strength when seamed and fused to a can body made of a transparent to translucent thermoplastic resin, have excellent manufacturability and surface quality, and are thus extremely useful as a can lid and a can bottom for a resin-metal composite container. In addition, the resin-metal composite container of the present invention has excellent external appearance and high seaming strength and is thus extremely useful.

BRIEF DESCRIPTION OF THE REFERENCE SYMBOLS

1 Steel sheet
2 Modified polypropylene-based resin layer
3 Polypropylene-based resin layer
4 Ethylene-propylene copolymer resin layer
5 PP-based resin layer
6 Thermoplastic polyester-based resin layer
20 Resin laminate steel sheet
21 First seamed portion
22 Second seamed portion
23 First fused portion
24 Second fused portion
30 Curved portion
40 Top sheet portion
51 Hot roll
52 Film laminating roll
53 Water cooling tank
100 Can lid made of resin laminate steel sheet for resin-metal composite container
101 Can bottom made of resin laminate steel sheet for resin-metal composite container
102 Can body
200 Resin-metal composite container
S1 Heating step
S2 Film laminating step
S3 Cooling step

The invention claimed is:
1. A can lid made of a resin laminate steel sheet for a resin-metal composite container, comprising:
  a top sheet portion made of a resin laminate steel sheet; and
  a curved portion made of the resin laminate steel sheet and located at an outer periphery of the top sheet portion,
  wherein the resin laminate steel sheet includes
    a steel sheet,
    a thermoplastic polyester-based resin layer provided at a first surface of the steel sheet and in contact with the steel sheet,
    a modified polypropylene-based resin layer provided at a second surface of the steel sheet and in contact with the steel sheet,
    a polypropylene-based resin layer provided as an upper layer to the modified polypropylene-based resin layer and in contact with the modified polypropylene-based resin layer, and
    an ethylene-propylene copolymer resin layer provided as an upper layer to the polypropylene-based resin layer to be and in contact with the polypropylene-based resin layer and containing an ethylene-propylene copolymer including an ethylene component and a propylene component,
  a melting point of the ethylene-propylene copolymer resin layer is 135° C. or higher and 150° C. or lower,
  a melting point of the thermoplastic polyester-based resin layer is higher than a melting point of the polypropylene-based resin layer by 40° C. or more,
  a proportion of the ethylene component in the ethylene-propylene copolymer in the ethylene-propylene copolymer resin layer is 1.0 mass % or more and 45.0 mass % or less,
  an average thickness of the ethylene-propylene copolymer resin layer is 1.0 μm or more and 15.0 μm or less,
  an average thickness of the polypropylene-based resin layer is 6.0 μm or more,
  an average thickness of the modified polypropylene-based resin layer is 1.0 μm or more and 18.0 μm or less,
  a total average thickness of the ethylene-propylene copolymer resin layer, the polypropylene-based resin layer, and the modified polypropylene-based resin layer is 20.0 μm or more,
  the second surface is at an inside bend of the curved portion, and
  the first surface is at an outside bend of the curved portion.
2. The can lid made of a resin laminate steel sheet for a resin-metal composite container according to claim 1,
  wherein the proportion of the ethylene component in the ethylene-propylene copolymer in the ethylene-propylene copolymer resin layer is 1.0 mass % or more and 35.0 mass % or less.
3. A can bottom made of a resin laminate steel sheet for a resin-metal composite container, comprising:
  a top sheet portion made of a resin laminate steel sheet; and
  a curved portion made of the resin laminate steel sheet and located at an outer periphery of the top sheet portion,
  wherein the resin laminate steel sheet includes
    a steel sheet,
    a thermoplastic polyester-based resin layer provided at a first surface of the steel sheet and in contact with the steel sheet,
    a modified polypropylene-based resin layer provided at a second surface of the steel sheet and in contact with the steel sheet,
    a polypropylene-based resin layer provided as an upper layer to the modified polypropylene-based resin layer and in contact with the modified polypropylene-based resin layer, and
    an ethylene-propylene copolymer resin layer provided as an upper layer to the polypropylene-based resin layer and in contact with the polypropylene-based resin layer and containing an ethylene-propylene copolymer including an ethylene component and a propylene component,
  a melting point of the ethylene-propylene copolymer resin layer is 135° C. or higher and 150° C. or lower,
  a melting point of the thermoplastic polyester-based resin layer is higher than a melting point of the polypropylene-based resin layer by 40° C. or more,
  a proportion of the ethylene component in the ethylene-propylene copolymer in the ethylene-propylene copolymer resin layer is 1.0 mass % or more and 45.0 mass % or less, an average thickness of the ethylene-propylene copolymer resin layer is 1.0 μm or more and 15.0 μm or less, an average thickness of the polypropylene-based resin layer is 6.0 μm or more, an average thickness of the modified polypropylene-based resin layer is 1.0 μm or more and 18.0 μm or less, a total average thickness of the ethylene-propylene copolymer resin layer, the polypropylene-based resin layer, and the modified polypropylene-based resin layer is 20.0 μm or more, the second surface is at an inside bend of the curved portion, and the first surface is at an outside bend of the curved portion.

4. The can bottom made of a resin laminate steel sheet for a resin-metal composite container according to claim 3, wherein the proportion of the ethylene component in the ethylene-propylene copolymer in the ethylene-propylene copolymer resin layer is 1.0 mass % or more and 35.0 mass % or less.

5. A resin-metal composite container comprising:

a can lid;

a can body made of a polypropylene-based resin;

a can bottom;

a first seamed portion in which the can lid and the can body are seamed; and a second seamed portion in which the can bottom and the can body are seamed, wherein the first seamed portion has a first fused portion in which the can lid and the can body are fused, the second seamed portion has a second fused portion in which the can bottom and the can body are fused, at least one of the can lid or the can bottom includes a steel sheet, a thermoplastic polyester-based resin layer provided at a first surface of the steel sheet and in contact with the steel sheet, a modified polypropylene-based resin layer provided at a second surface of the steel sheet and in contact with the steel sheet, a polypropylene-based resin layer provided as an upper layer to the modified polypropylene-based resin layer and in contact with the modified polypropylene-based resin layer, and an ethylene-propylene copolymer resin layer provided as an upper layer to the polypropylene-based resin layer and in contact with the polypropylene-based resin layer and containing an ethylene-propylene copolymer including an ethylene component and a propylene component, a melting point of the ethylene-propylene copolymer resin layer is 135° C. or higher and 150° C. or lower, a melting point of the thermoplastic polyester-based resin layer is higher than a melting point of the polypropylene-based resin layer by 40° C. or more, a proportion of the ethylene component in the ethylene-propylene copolymer in the ethylene-propylene copolymer resin layer is 1.0 mass % or more and 45.0 mass % or less, an average thickness of the ethylene-propylene copolymer resin layer is 1.0 μm or more and 15.0 μm or less, an average thickness of the polypropylene-based resin layer is 6.0 μm or more, an average thickness of the modified polypropylene-based resin layer is 1.0 μm or more and 18.0 μm or less, a total average thickness of the ethylene-propylene copolymer resin layer, the polypropylene-based resin layer, and the modified polypropylene-based resin layer is 20.0 μm or more, the second surface is on a can body side, and the first surface is on a side opposite to the can body side.

6. The resin-metal composite container according to claim 5, wherein the proportion of the ethylene component in the ethylene-propylene copolymer in the ethylene-propylene copolymer resin layer is 1.0 mass % or more and 35.0 mass % or less.

\* \* \* \* \*